United States Patent
Denton et al.

(10) Patent No.: US 10,343,104 B2
(45) Date of Patent: *Jul. 9, 2019

(54) REMOVING CARBON NANOTUBES FROM A CONTINUOUS REACTOR EFFLUENT

(71) Applicants: ExxonMobil Upstream Research Company, Houston, TX (US); Solid Carbon Products LLC, Provo, UT (US)

(72) Inventors: Robert D. Denton, Houston, TX (US); Dallas B. Noyes, Provo, UT (US); Russell J. Koveal, Jr., Baton Rouge, LA (US); Terry A. Ring, Sandy, UT (US)

(73) Assignees: EXXONMOBIL UPSTREAM RESEARCH COMPANY, Houston, TX (US); SOLID CARBON PRODUCTS, LLC, Provo, UT (US)

( * ) Notice: Subject to any disclaimer, the term of this patent is extended or adjusted under 35 U.S.C. 154(b) by 488 days.

This patent is subject to a terminal disclaimer.

(21) Appl. No.: 14/395,447

(22) PCT Filed: Apr. 10, 2013

(86) PCT No.: PCT/US2013/035988
§ 371 (c)(1),
(2) Date: Oct. 17, 2014

(87) PCT Pub. No.: WO2013/158440
PCT Pub. Date: Oct. 24, 2013

(65) Prior Publication Data
US 2015/0059571 A1 Mar. 5, 2015

Related U.S. Application Data

(60) Provisional application No. 61/625,671, filed on Apr. 18, 2012.

(51) Int. Cl.
*B01D 50/00* (2006.01)
*B03C 3/017* (2006.01)
(Continued)

(52) U.S. Cl.
CPC ........... *B01D 50/002* (2013.01); *B01D 45/02* (2013.01); *B01D 45/12* (2013.01);
(Continued)

(58) Field of Classification Search
CPC ........ B01D 45/02; B01D 45/04; B01D 45/12; B01D 45/14; B01D 45/16; B01D 46/0034;
(Continued)

(56) References Cited

U.S. PATENT DOCUMENTS 2,796,331 A 6/1957 Kauffman et al.
4,125,456 A * 11/1978 Henderson ............. B01D 45/02
209/138
(Continued)

FOREIGN PATENT DOCUMENTS

CN 1817791 A 8/2006
CN 101959793 A 1/2011
(Continued)

OTHER PUBLICATIONS

Chinese Office Action, CN Application No. 2013800205787 dated Nov. 25, 2015, 16 pages.
(Continued)

*Primary Examiner* — Robert Clemente
(74) *Attorney, Agent, or Firm* — International IP Law Group, P.L.L.C.

(57) ABSTRACT

Systems and a method for removing carbon nanotubes from a continuous reactor effluent are provided herein. The method includes flowing the continuous reactor effluent through a separation vessel, separating carbon nanotubes (Continued)

from the continuous reactor effluent in the separation vessel, and generating a stream including gaseous components from the continuous reactor effluent.

29 Claims, 13 Drawing Sheets

(51) Int. Cl.
| | | |
|---|---|---|
| B82Y 30/00 | (2011.01) | |
| B82Y 40/00 | (2011.01) | |
| B01D 45/02 | (2006.01) | |
| B01D 45/12 | (2006.01) | |
| B01D 46/00 | (2006.01) | |
| B01D 46/04 | (2006.01) | |
| B01D 46/38 | (2006.01) | |
| C01B 32/164 | (2017.01) | |
| C01B 32/168 | (2017.01) | |
| C01B 32/17 | (2017.01) | |

(52) U.S. Cl.
CPC ......... *B01D 46/0034* (2013.01); *B01D 46/04* (2013.01); *B01D 46/38* (2013.01); *B03C 3/017* (2013.01); *B82Y 30/00* (2013.01); *B82Y 40/00* (2013.01); *C01B 32/164* (2017.08); *C01B 32/168* (2017.08); *C01B 32/17* (2017.08)

(58) Field of Classification Search
CPC .. B01D 50/002; B01D 50/006; B01D 50/008; C01B 31/0253; C01B 31/026; C01B 31/0266; B03C 3/017
See application file for complete search history.

(56) References Cited

U.S. PATENT DOCUMENTS

| | | | | |
|---|---|---|---|---|
| 4,749,387 | A | * | 6/1988 | Lotz ................. B01D 45/02 55/315.1 |
| 4,874,407 | A | | 10/1989 | Lefkowitz |
| 7,585,483 | B2 | | 9/2009 | Edwin et al. |
| 7,811,542 | B1 | | 10/2010 | McElrath et al. |
| 9,567,219 | B2 | * | 2/2017 | Denton ................ D01F 9/127 |
| 2001/0001173 | A1 | * | 5/2001 | Lotens ................ B01D 50/006 95/195 |
| 2001/0003783 | A1 | * | 6/2001 | Nishimura ............ C07C 51/252 562/512 |
| 2002/0102193 | A1 | * | 8/2002 | Smalley .............. B01J 3/008 422/600 |
| 2002/0131910 | A1 | | 9/2002 | Resasco et al. |
| 2003/0041732 | A1 | * | 3/2003 | Alford .............. B01D 46/0068 95/280 |
| 2005/0074392 | A1 | | 4/2005 | Yang et al. |
| 2006/0062718 | A1 | | 3/2006 | Bahr et al. |
| 2008/0028940 | A1 | * | 2/2008 | Han .................. B01D 45/16 96/417 |
| 2008/0115407 | A1 | * | 5/2008 | Hoffman ............. B01J 8/025 44/385 |
| 2008/0230458 | A1 | * | 9/2008 | Lean .................. B01D 45/12 210/195.1 |
| 2008/0233041 | A1 | * | 9/2008 | Jang .................. B03C 1/286 423/445 B |
| 2008/0274277 | A1 | | 11/2008 | Rashidi et al. |
| 2009/0101505 | A1 | * | 4/2009 | Marino et al. |
| 2009/0196806 | A1 | * | 8/2009 | Larnholm ............ B01D 45/12 422/269 |
| 2009/0301861 | A1 | * | 12/2009 | Azami ................ B01D 45/02 204/157.41 |
| 2010/0025225 | A1 | | 2/2010 | Henderson et al. |
| 2010/0217059 | A1 | | 8/2010 | Reyneke et al. |
| 2010/0316556 | A1 | | 12/2010 | Wei et al. |
| 2011/0085961 | A1 | * | 4/2011 | Noda ................. B01J 37/0217 423/447.3 |
| 2012/0269708 | A1 | * | 10/2012 | Pavone .............. B01D 50/002 423/230 |
| 2014/0348739 | A1 | * | 11/2014 | Denton ................ D01F 9/127 423/447.3 |

FOREIGN PATENT DOCUMENTS

| | | | |
|---|---|---|---|
| EP | 2269950 | A1 | 12/2001 |
| JP | S63-104670 | A | 3/1990 |
| JP | 2002068720 | A | 3/2002 |
| JP | 2002211909 | A | 7/2002 |
| JP | 2003-535794 | A | 12/2003 |
| JP | 2004255379 | A | 9/2004 |
| JP | 2005501789 | A | 1/2005 |
| JP | 2006-511437 | A | 4/2006 |
| JP | 2006-261131 | A | 9/2006 |
| JP | 2007-519592 | A | 7/2007 |
| JP | 2008044840 | A | 2/2008 |
| JP | 2009125698 | A | 6/2009 |
| WO | WO0194260 | A1 | 12/2001 |
| WO | 2009/110591 | A1 | 9/2009 |
| WO | WO/2010/120581 | A1 | 10/2010 |
| WO | WO-2011067336 | A1 * | 6/2011 ............. B01D 45/16 |
| WO | 2011/102433 | A1 | 8/2011 |
| WO | 2013/090444 | A1 | 6/2013 |

OTHER PUBLICATIONS

Karthikeyan, et al., Large Scale Synthesis of Carbon Nanotubes. E-Journal of Chemistry, 2009, 6(1), 1-12.
PCT International Preliminary Report on Patentability, dated Jun. 6, 2014, for PCT Application PCT/US13/35988, dated Apr. 10, 2013.
PCT International Search Report, dated Aug. 2, 2013, for PCT Application PCT/US13/35988, dated Apr. 10, 2013.
Vander Wal, R.L., et al., Flame Synthesis of Single-Walled Carbon Nanotubes and Nanofibers. Seventh International Workshop on Microgravity Combustion and Chemically Reacting Systems, Aug. 2003, 73-76 (NASA Research Publication: NASA/CP—2003-212376/REV1).
Written Opinion of the International Search Authority, dated Aug. 2, 2013, for PCT Application PCT/US13/35988, dated Apr. 10, 2013.
Australian Patent Examination Report No. 1, dated Oct. 8, 2015.
Intellectual Property Office of Singapore Written Opinion, SG Application No. 11201405617V dated May 17, 2016, 8 pages.
Supplementary European Search Report, EP Application No: 13778226 dated Nov. 18, 2015, 2 pages.
Supplementary Taiwan Search Report, TW Application No. 102110505 dated Jan. 20, 2017, 1 page.
Japanese Non-Final Office Action, JP Application No.: 2015-507052 dated Apr. 19, 2017, 7 pages.
Japanese Office Action, JP Application No.: 2015-507052 dated Oct. 12, 2017, 4 pages.

* cited by examiner

100

200

800

REMOVING CARBON NANOTUBES FROM A CONTINUOUS REACTOR EFFLUENT

CROSS REFERENCE TO RELATED APPLICATIONS

Pursuant to 35 U.S.C. §371, this application is a United States National Stage Application of International Patent Application No. PCT/US2013/035988, filed on 10 Apr. 2013, which claims priority based on U.S. Provisional Application Ser. No. 61/625,671, filed 18 Apr. 2012, titled "Removing Carbon Nanotubes From A Continuous Reactor Effluent" the contents of which are incorporated by reference as if set forth in their entirety herein. The previous provisional applications are related to U.S. patent application Ser. No. 13/263,311 by Noyes and titled "Method for Producing Solid Carbon by Reducing Carbon Oxides," which was filed 6 Oct. 2011, which claims priority based on International Patent Application Number PCT/US2010/029934, by Noyes, entitled "Method for Producing Solid Carbon by Reducing Carbon Oxides," which was filed on 5 Apr. 2010, which in turn claims priority based on U.S. Provisional Patent Application Ser. No. 61/170,199 filed 17 Apr. 2009 and titled "Method for Producing Solid Carbon by Reducing Carbon Oxides," the disclosures of all of which are incorporated herein by this reference.

FIELD

The present techniques relate to an industrial scale process for making carbon nanotubes. Specifically, the techniques are focused on removing carbon nanotubes from a continuous reactor effluent stream.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

Materials formed predominately of solid or elemental carbon have been used in numerous products for many years. For example, carbon black is a high carbon content material used as a pigment and reinforcing compound in rubber and plastic products, such as car tires. Carbon black is usually formed by the incomplete thermal pyrolysis of hydrocarbons, such as methane or heavy aromatic oils. Thermal blacks, formed by the pyrolysis of natural gas, include large unagglomerated particles, for example, in the range of 200-500 nm in size, among others. Furnace blacks, formed by the pyrolysis of heavy oils, include much smaller particles, in the range of 10-100 nm in size, that agglomerate or stick together to form structures. In both cases, the particles may be formed from layers of graphene sheets that have open ends or edges. Chemically, the open edges form reactive areas that can be used for absorption, bonding into matrices, and the like.

More recent forms of elemental carbon, such as fullerenes, have been developed, and are starting to be developed in commercial applications. In contrast to the more open structures of carbon black, fullerenes are formed from carbon in a closed graphene structure, i.e., in which the edges are bonded to other edges to form spheres, tubes, and the like. Two structures, carbon nanofibers and carbon nanotubes, have numerous potential applications, ranging from batteries and electronics to the use in concrete in the construction industry. Carbon nanomaterials may have a single wall of graphene or multiple nested walls of graphene or form a fiber structure from a stacked set of sheets in a cup or plate form. The ends of the carbon nanotubes are often capped with hemispherical structures, in a fullerene-like configuration. Unlike for carbon black, large scale production processes have not been implemented for carbon nanomaterials. However, research has been conducted on a number of proposed production processes.

Arc-based, laser-based ablation techniques and chemical vapor deposition have classically been used to generate carbon nanotubes from a carbon surface. For example, techniques for generating carbon nanotubes are reviewed in Karthikeyan, et al., "Large Scale Synthesis of Carbon Nanotubes," E-Journal of Chemistry, 2009, 6(1), 1-12. In one technique described, an electric arc is used to vaporize graphite from electrodes in the presence of metal catalysts, achieving production rates of about 1 gram/minute. Another technique described uses laser ablation to vaporize carbon from a target electrode in an inert gas stream. However, the laser technique uses high purity graphite and high power lasers, but provides a low yield of carbon nanotubes, making it impractical for large scale synthesis. A third technique described by the authors is based on chemical vapor deposition (CVD), in which a hydrocarbon is thermally decomposed in the presence of a catalyst. In some studies, these techniques have achieved production rates of up to a few kilograms/hour at a 70% purity level. However, none of the processes described are practical for large scale commercial production.

Hydrocarbon pyrolysis is used in the production of carbon black and various carbon nanotube and fullerene products. Various methods exist for creating and harvesting various forms of solid carbon through the pyrolysis of hydrocarbons using temperature, pressure, and the presence of a catalyst to govern the resulting solid carbon morphology. For example, Kauffman, et al., (U.S. Pat. No. 2,796,331) discloses a process for making fibrous carbon of various forms from hydrocarbons in the presence of surplus hydrogen using hydrogen sulfide as a catalyst, and methods for collecting the fibrous carbon on solid surfaces. Kauffman also claims the use of coke oven gas as the hydrocarbon source.

In another study, a flame based technique is described in Vander Wal, R. L., et al., "Flame Synthesis of Single-Walled Carbon Nanotubes and Nanofibers," Seventh International Workshop on Microgravity Combustion and Chemically Reacting Systems, August 2003, 73-76 (NASA Research Publication: NASA/CP-2003-212376/REV1). The technique used the introduction of a CO or $CO/C_2H_2$ mixture into a flame along with a catalyst to form the carbon nanotubes. The authors noted that high productivity could be achieved using flame based techniques for the production of carbon black. However, the authors noted that scaling the flame synthesis presented numerous challenges. Specifically, the total time for catalyst particle formation, inception of the carbon nanotubes, and growth of the carbon nanotubes was limited to about 100 ms.

International Patent Application Publication WO/2010/120581, by Noyes, discloses a method for the production of various morphologies of solid carbon product by reducing carbon oxides with a reducing agent in the presence of a catalyst. The carbon oxides are typically either carbon monoxide or carbon dioxide. The reducing agent is typically either a hydrocarbon gas or hydrogen. The desired morphology of the solid carbon product may be controlled by the specific catalysts, reaction conditions, and optional additives used in the reduction reaction.

While all of the techniques described can be used to form carbon nanotubes, none of the processes provide a practical method for bulk or industrial scale production. Specifically, the amounts formed or the process efficiencies, or both, are low. Further, the techniques described above do not provide for the efficient removal or separation of the carbon nanotubes from impurities following such a bulk or industrial scale production of the carbon nanotubes.

SUMMARY

An embodiment provides a system for removing carbon nanotubes from a continuous reactor effluent. The system includes a separation vessel configured to isolate the carbon nanotubes from the continuous reactor effluent and generate a stream including gaseous components from the continuous reactor effluent.

Another embodiment provides a method for removing carbon nanotubes from a continuous reactor effluent. The method includes flowing the continuous reactor effluent through a separation vessel, separating carbon nanotubes from the continuous reactor effluent in the separation vessel, and generating a stream including gaseous components from the continuous reactor effluent.

Another embodiment provides a system for creating a purified stream of carbon nanotubes from a gas flow. The system includes a separation system configured to generate a first purified stream of the carbon nanotubes and a first residual stream including gaseous components from the gas flow. The system also includes a filtration system configured to generate a second purified steam of the carbon nanotubes and a second residual stream including impurities from the first purified stream of the carbon nanotubes.

DESCRIPTION OF THE DRAWINGS

The advantages of the present techniques are better understood by referring to the following detailed description and the attached drawings, in which.

DETAILED DESCRIPTION

Figure 1:
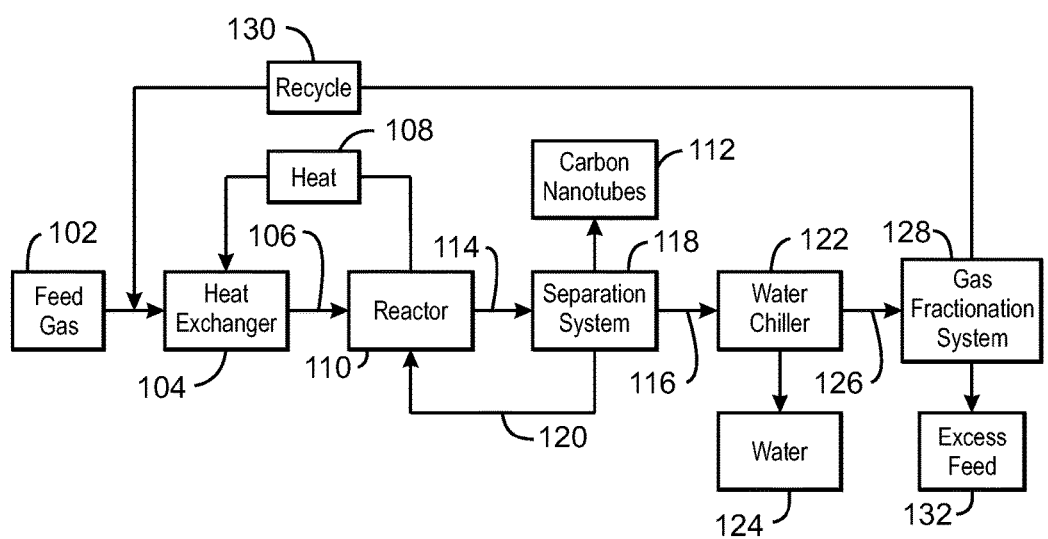
FIG. 1 is a block diagram of a reaction system that generates carbon allotropes, for example, as a by-product of a carbon dioxide sequestration reaction.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described below, but rather, include all alternatives, modifications, and equivalents falling within the spirit and scope of the appended claims.

At the outset, for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

Carbon fibers, nanofibers, and nanotubes are allotropes of carbon that have a cylindrical structure, which can be in the nanometer range. Carbon nanofibers and nanotubes are members of the fullerene structural family, which includes the spherical carbon balls termed "Buckminster fullerene." The walls of the carbon nanotubes are formed from sheets of carbon in a graphene structure. As used herein, nanotubes may include single wall nanotubes and multiple wall nanotubes of any length. The terms "carbon allotropes" and "carbon nanotubes" as used herein, include carbon fibers, carbon nanofibers, and other carbon nanostructures.

A "compressor" is a device for compressing a working gas, including gas-vapor mixtures or exhaust gases, and includes pumps, compressor turbines, reciprocating compressors, piston compressors, rotary vane or screw compressors, and devices and combinations capable of compressing a working gas. In some embodiments, a particular type of compressor, such as a compressor turbine, may be preferred. A piston compressor may be used herein to include a screw compressor, rotary vane compressor, and the like.

A "hydrocarbon" is an organic compound that primarily includes the elements hydrogen and carbon, although nitrogen, sulfur, oxygen, metals, or any number of other elements may be present in small amounts. As used herein, hydrocarbons generally refer to components found in natural gas, oil, or chemical processing facilities.

As used herein, the term "natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., carbon dioxide or hydrogen sulfide), or any combination thereof. The natural gas can also contain minor amounts of contaminants such as water, nitrogen, iron sulfide, wax, crude oil, or any combination thereof. The natural gas stream may be substantially purified prior to use in embodiments, so as to remove compounds that may act as poisons.

A "low-BTU natural gas" is a gas that includes a substantial proportion of $CO_2$ as harvested from a reservoir. For example, a low BTU natural gas may include 10 mol % or higher $CO_2$ in addition to hydrocarbons and other components. In some cases, the low BTU natural gas may include mostly $CO_2$.

As used herein, a "plant" is an ensemble of physical equipment in which chemical or energy products are processed or transported. In its broadest sense, the term plant is applied to any equipment that may be used to produce energy or form a chemical product. Examples of facilities include polymerization plants, carbon black plants, natural gas plants, and power plants.

Overview

Embodiments described herein provide systems and methods for separating carbon nanotubes (CNTs) entrained in an effluent stream from a reactor. The removal allows for the isolation of the carbon nanotubes for packaging.

The carbon nanotubes may be made using feedstocks that can include nearly stoichiometric mixtures of carbon dioxide and methane, among others. In some embodiments, the feedstocks are higher in $CH_4$, while in other embodiments, the feedstocks are higher in $CO_2$. Other feedstocks may be used, including mixtures of any number of compounds having C, H, and O, such as $H_2$, CO, $CO_2$, and other hydrocarbons. The process is conducted under high temperature and pressure conditions using a Bosch-like reaction, as discussed with respect to FIG. 2.

The process may be slightly exothermic, energy neutral, or slightly endothermic, depending upon the level of reforming relative to carbon formation taking place in the specific design. Accordingly, at least a portion of the heat from the effluent can be recovered and used to heat the feed gases, providing a portion of the heat used by the process during continuous operations. As a high pressure process is used, an ambient temperature heat exchanger is sufficient for the removal of water vapor from the product stream, without using cryogenic coolers. After separation of the product and water formed during the reaction, a gas fractionation system is used to separate any remaining amounts of the limiting reagent from a waste gas mixture and recycle the limiting reagent to the process. In addition, fuel for the process can be supplied using the effluent stream either prior to or after gas fractionation.

As used herein, an ambient temperature heat exchanger can include water chillers, air coolers, or any other cooling system that exchanges heat with a source that is at substantially ambient temperature. It can be understood that ambient temperature is substantially the temperature of the outside air at the location of the facility, e.g., ranging from about −40° C. to about +40° C., depending on the location of the facility. Further, different types of ambient temperature heat exchangers may be used depending on current ambient temperature. For example, a facility that uses water chillers in a summer season may use air coolers in a winter season. It can be understood that an appropriate type of heat exchanger may be used at any point herein that describes the use of an ambient temperature heat exchanger. The ambient temperature heat exchangers may vary in type across the plant depending on the amount of cooling needed.

The present process can use various feedstocks, including, for example, carbon, hydrogen, and oxygen. For example, feedstocks can include a carbon oxide, e.g., carbon dioxide ($CO_2$) or carbon monoxide (CO), and a reducing agent, e.g., methane ($CH_4$) or other hydrocarbons, hydrogen ($H_2$), or combinations thereof. The reducing agent may include other hydrocarbon gases, hydrogen ($H_2$), or mixtures thereof. A hydrocarbon gas can act as both an additional carbon source and as the reducing agent for the carbon oxides. Other gases, such as syngas, are created as intermediate compounds in the process or may be contained in the feed. These gases can also be used as the reducing agent. Syngas, or "synthetic gas," includes carbon monoxide (CO) and hydrogen ($H_2$) and, thus, includes both the carbon oxide and the reducing gas in a single mixture. Other compounds that include both carbon and oxygen may be used instead of, or in addition to, the feedstocks above. In some embodiments, any feedstock with a C, H, and O makeup that falls within the prescribed area in FIG. 2 can be used to make these products.

Carbon oxides, particularly carbon dioxide, are abundant gases that may be extracted from exhaust gases, low-BTU well gas, and from some process off-gases. Although carbon dioxide may also be extracted from the air, other sources often have much higher concentrations and are typically more economical sources from which to harvest the carbon dioxide. Further, carbon dioxide is available as a by-product of power generation. The use of $CO_2$ from these sources may lower the emission of carbon dioxide by converting a portion of the $CO_2$ into carbon products.

According to embodiments disclosed herein, various separation techniques may be used to separate carbon nanotubes from a residual gas stream, e.g., a stream including gaseous components and other impurities, from a continuous reactor effluent. Such separation techniques include, for example, cyclonic separation, magnetic separation, density based separation, electrostatic separation, or gravity separation techniques, among others. For example, in some embodiments, a multicyclonic separator may be used to separate a purified stream of CNTs from a residual stream of impurities. In other embodiments, a filtration system, such as a sintered ceramic or sintered metal filtration system, may be used to separate the purified stream of CNTs from the residual stream of impurities.

As used herein, an industrial scale process may provide large quantities of carbon allotropes in short periods of time. For example, the techniques used herein may provide carbon allotropes in quantities greater than about 0.5 Kg/hr, greater than about 1 Kg/hr, greater than about 2 Kg/hr, greater than about 5 Kg/hr, greater than about 10 Kg/hr, greater than about 100 Kg/hr, or greater than 1000 Kg/hr. The amounts produced depend on the scale of the equipment and the catalysts chosen.

FIG. 1 is a block diagram of a reaction system 100 that generates carbon allotropes, for example, as a by-product of a carbon dioxide sequestration reaction. The reaction system 100 is provided with a feed gas 102, which can be a mixture of $CO_2$ and $CH_4$. In some embodiments, the reaction may allow for sequestration of $CO_2$ from exhaust streams of power plants and the like. In other embodiments, the $CH_4$ is at a higher concentration, for example, in a gas stream from a natural gas field. Other components may be present in the feed gas 102, such as $C_2H_6$, $C_2H_4$, and the like. In one embodiment, the feed gas 102 has been treated to remove these components, for example, for sale as product streams.

The feed gas 102 is passed through a heat exchanger 104 to form a heated feed gas 106. During continuous operation, a portion of the heating is provided using heat 108 recovered from the reaction. The remaining heat for the reaction may be provided by an auxiliary heater, as described below. During start-up, the auxiliary heater is used to provide the total heat to bring the feed to the appropriate reaction temperature, e.g., about 500° C. (about 930° F.). In one embodiment, the feed is heated to between about 500° C. (about 932° F.) to about 550° C. (about 1022° F.). In another embodiment, the feed is heated to between about 700° C. (about 1292° F.) to about 750° C. (about 1382° F.). In another embodiment, the feed is heated to between about 800° C. (about 1472° F.) to about 850° C. (about 1562° F.). The heated feed gas 108 is fed to a reactor 110.

In the reactor 110, a catalyst reacts with a portion of the heated feed gas 106 to form carbon nanotubes (CNTs) 112, and other carbon allotropes, using Bosch-like reactions. As described in more detail below, the reactor 110 can be a fluidized bed reactor that uses any number of different catalysts, including, for example, metal shot, supported catalysts, and the like. The CNTs 112 are separated from the reactor effluent 114, leaving a waste gas stream 116 containing excess reagents and water vapor. At least a portion of the heat from the reactor effluent 114 is used to form the heated feed gas 106 prior to the reactor effluent 114 entering the chiller as the waste gas stream 116.

The separation of the CNTs 112 from the reactor effluent 114 may be accomplished using a separation system 118. In various embodiments, the separation system 118 may be directly coupled to the reactor 110, as shown in FIG. 1. The reactor effluent 114 may be a continuous reactor effluent containing the CNTs 112, as well as gaseous components and excess reagent. It is desirable to efficiently isolate the CNTs 112 from the reactor effluent 114 in order to increase the degree of purity of the final carbon nanotube product and to lower the amount of CNTs that are carried over into the waste streams.

In some embodiments, an initial separation process may be performed within the separation system 118 to separate catalyst particles 120 from the reactor effluent 114. For example, a magnetic separation vessel or a cyclonic separation vessel located within the separation system 118 may be used to remove the catalyst particles 120 from the reactor effluent 114. The catalyst particles 120 may then be returned to the reactor 110, as indicated in FIG. 1. It is often useful to recycle such catalyst particles 120 to the reactor 110 to be reused for the creation of the CNTs 112 within the reactor 110 and to lower the amount of metal in the final product.

In various embodiments, the separation system 118 may also be configured to isolate the CNTs 112 from the reactor effluent 114 and generate the waste gas stream 116. The waste gas stream 116 may include gaseous components, such as excess reagents, small amounts of CNTs 112, and other impurities. The separation of the CNTs 112 from the reactor effluent 114 may be accomplished through a variety of techniques. For example, in some embodiments, the separation system 118 may be configured to perform a gravity separation process. The gravity separation process may be implemented using a cyclonic separator, multicyclonic separator, or drift separator, among others. In some embodiments, the separation system 118 may be configured to perform an electrostatic separation process using, for example, an electrostatic precipitator or other electrostatic separation unit. Further, in some embodiments, the separation system 118 may be configured to perform a magnetic separation process using, for example, paramagnetic catalysts.

In various embodiments, the separation system 118 may contain a filter that is configured to aid in the separation of the CNTs 112 from the reactor effluent 114. The filter may be a sintered ceramic filter, a sintered metal filter, a fabric bag filter, or a fluidized bed filter, among others. In addition, the filter may be configured to perform a self-cleaning procedure to remove any remaining CNTs 112 or other residual particles. Further, in some embodiments, the separation system 118 may contain any number of additional components for removing the CNTs 112 from the reactor effluent 114. Once the CNTs 112 have been sufficiently purified, they may be provided to the market.

The waste gas stream 116 is passed through an ambient temperature heat exchanger, such as water chiller 122, which condenses out the water 124. The resulting dry waste gas stream 126 can be used as a feed stream for a gas fractionation system 128, or may be directly recycled in part. It can be understood that a dry waste gas stream, as used herein, has the bulk of the water removed, but may still have small amounts of water vapor. For example, the dew point of a dry waste gas stream may be greater than about −5° C., greater than about 0° C., greater than about 5° C., greater than about 10° C., greater than about 20° C., or higher. A dryer may be used to lower the dewpoint, for example, to about −50° C., about −70° C., or lower, as part of the gas fractionation system 128.

The gas fractionation system 128 removes a portion of the reagent having the lower concentration in the feed gas 102 and recycles it to the process, for example, by blending a recycle stream 130 with the feed gas 102. The higher concentration gas in the feed gas 102 can be disposed of as excess feed 132, for example, by sales to downstream users. As an example, if $CO_2$ is the highest concentration gas in a blend with $CH_4$, the gas fractionation system 128 can be used to remove $CH_4$ remaining in the waste gas stream, and send it back into the process as recycle stream 130. The process functions as an equilibrium reaction between the reagents and solid carbon, as discussed further with respect to FIG. 2. The gas fractionation system 128 may not be needed when the $CH_4$ is in excess, as much of the $CO_2$ may be consumed in the reaction. Thus, the excess feed 132 that contains the $CH_4$, and which may also contain $H_2$, CO, and other gases, may be used to generate power in a power plant without further purification or gas separation. Further, in that circumstance, a portion of the dry waste gas stream 126 may be recycled to the process without further treatment.

Figure 2:
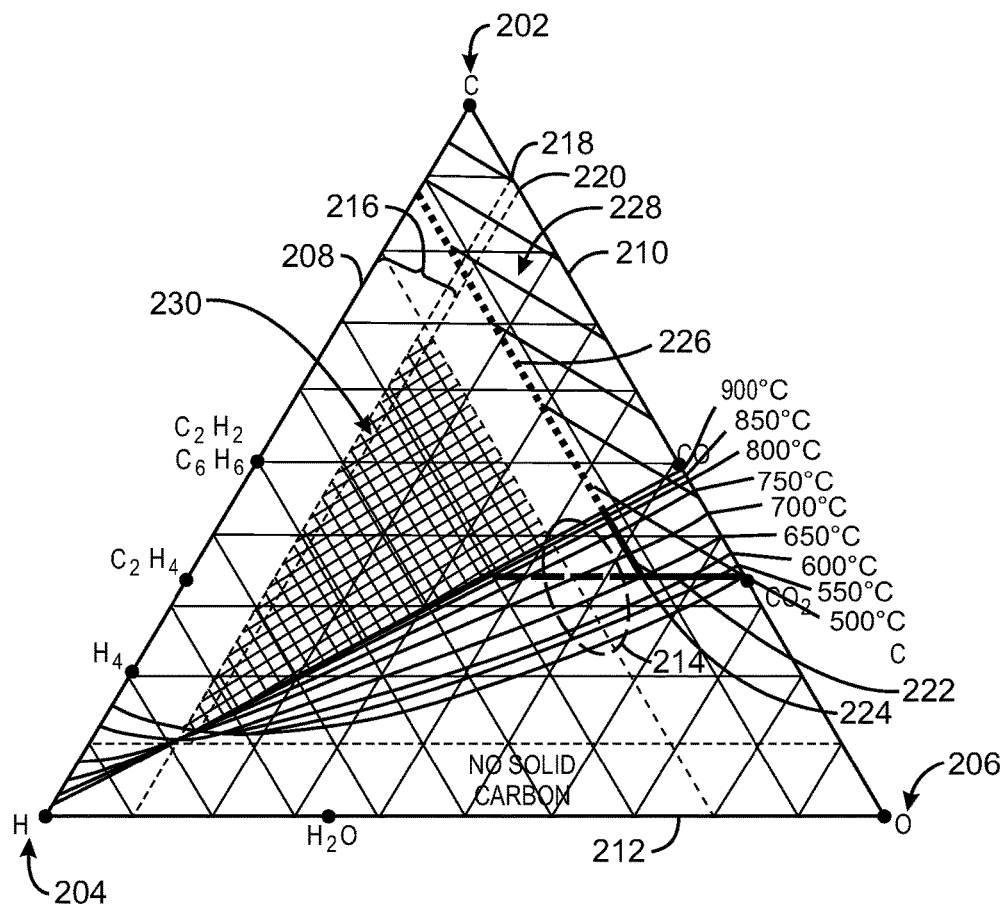
FIG. 2 is an equilibrium diagram that identifies conditions under which a solid carbon product will form.

FIG. 2 is an equilibrium diagram that identifies conditions under which a solid carbon product will form. This diagram is a triangular diagram 200 with the elements, C 202, H 204, and O 206, at the apexes of the triangle. As one moves from any location towards an apex the molar ratio of the element, C 202, H 204, and O 206, increases. In this way all of the possible compositions of the three elements can be mapped onto the triangular diagram 200.

Any chemical compound, or mixture, with any two or all these three elements can be mapped onto the triangular diagram 200 as indicated by the exemplary points marked. Some of the chemical compounds include hydrocarbons such as alkanes, alkenes, and alkynes, as well as many other types of hydrocarbons. The hydrocarbons are located on the C—H edge 208 connecting C 202 and H 204. Chemical compounds that include only the elements C 202 and O 206, including carbon monoxide (CO) and carbon dioxide ($CO_2$), occur along the C—O edge 210 connecting C 202 and O 206. Chemical compounds that include only the elements H 204 and O 206, such as water ($H_2O$), occur along the H—O edge 212 connecting H 204 and O 206.

In the central region of the triangular diagram 200 are chemical compounds and mixtures that have all three elements, C 202, H 204, and O 206. For example, these chemical compounds may include a very large number of individual components, such as alcohols, aldehydes, ethers, and materials with more complex structures, such as carbohydrates. Further, mixtures of compounds such as hydrogen, carbon oxides, and hydrocarbons may also be present.

Some of the first experiments to form fullerenes, $C_{60}$ and $C_{70}$, as well as carbon nanotubes (CNTs) were performed by laser ablation of a carbon electrode, capturing the carbon material in a mass spectrometer. The curves 214 shown in FIG. 2 show the limit of carbon production at various temperatures. These curves 214 were determined by performing a stoichiometrically constrained Gibbs minimization, which minimizes the Gibbs free energy of the resulting compounds based on the constraint that the amount of carbon, oxygen, and hydrogen are to be the same both before and after the reaction. The point where solid carbon formation occurs for the first time was noted as the composition was moved from a first composition point to a second composition point on the triangular diagram 200.

In thermodynamic terms, the curves 214 identify the points where the activity of carbon is about 1.0. Above a carbon activity of about 1.0, carbon solid forms in the center region, while below the carbon activity of about 1.0, no solid carbon forms. The triangle diagram 200 is useful for identifying the conditions where carbon allotropes, such as carbon nanotubes (CNTs) can possibly be produced, as well as determining compounds and mixtures that can be used for their production.

At the temperatures indicated in FIG. 2, most hydrocarbons, and other organic compounds, undergo thermal decomposition to produce small, thermodynamically stable, gas molecules, such as CO, $CO_2$, $CH_4$, $H_2O$, $H_2$, and the like. Under certain reaction conditions, these small gas molecules can react to produce carbon allotropes. In some cases, the carbon allotropes will be in the form of CNTs. Both single walled and multi-walled CNTs of various dimensions and chiralities can be made in these ways.

Reaction Pathways for the Formation of Carbon Allotropes

Hydrocarbons undergo thermal decomposition in two ways, depending upon the concentration of oxygen. Without oxygen being present, large hydrocarbon molecules will thermally decompose into smaller hydrocarbons, such as methane, ethane, propane, and hydrogen. These small hydrocarbons will further decompose to carbon and more hydrogen, giving an overall reaction as shown in Rxn. 1. This reaction, termed a pyrolysis reaction, occurs along the C—H edge 208.

$$C_nH_{2m} \leftrightarrow nC + mH_2 \qquad \text{Rxn. 1}$$

A representative case is the thermal decomposition of methane, shown in Rxn. 2.

$$CH_4 \leftrightarrow C + 2H_2 \qquad \text{Rxn. 2}$$

In the presence of a low amount of oxygen, hydrocarbons will react to form carbon monoxide and carbon dioxide and water as well as carbon allotropes and hydrogen according to the reaction shown in Rxn. 3. This reaction is termed the Bosch reaction, and occurs in the center region of the triangular diagram 200.

$$C_nH_{2m} + qO_2 \leftrightarrow qCO + qH_2O + (n-q)C + (m-q)H_2 \qquad \text{Rxn. 3}$$

The ratio of CO to $H_2O$ after reaction may differ depending upon the temperature of the system. Further, depending upon the amount of oxygen there may be some carbon dioxide in the product gases. Any carbon monoxide or carbon dioxide produced may react to form carbon allotropes at the high temperature conditions. Higher concentrations of $O_2$ typically results in higher temperatures, due to combustion, resulting in the production of more CO and $CO_2$ and less solid carbon and hydrogen. Thus, the reaction system must restrict the amount of oxygen present in the system in order to produce larger amounts of carbon allotropes.

Organic compounds that include small amounts of oxygen may also be useful in the production of carbon allotropes. These compounds thermally decompose to form small, thermodynamically stable, gas molecules which can further react on a catalyst surface to produce carbon allotropes and water according to the overall reaction shown in Rxn. 4, which is another example of the Bosch reaction.

$$C_nH_{2m}O_q \leftrightarrow nC + qH_2O + (m-q)H_2 \qquad \text{Rxn. 4}$$

Any carbon monoxide or carbon dioxide produced has a tendency to react to carbon at these high-temperature conditions, adding to the overall productivity. These reactions form the simplest embodiments of the Bosch reaction, shown in Rxn. 5.

$$CO_2 + 2H_2 \leftrightarrow C + 2H_2O \qquad \text{Rxn. 5}$$

The Bosch reaction can be mechanistically written as two separate reactions in which CO is produced as an intermediate, as shown in Rxns. 6 and 7.

$$CO_2 + H_2 \leftrightarrow C + H_2O \qquad \text{Rxn. 6}$$

$$CO + H_2 \leftrightarrow C + H_2O \qquad \text{Rxn. 7}$$

The first, Rxn. 6, is fast and tends toward equilibrium. The second, Rxn. 7, is slow. Another reaction that can produce carbon allotropes is the Boudouard reaction that is shown in Rxn. 8. The Boudouard reaction takes place on the C—O edge 210, and produces carbon allotropes and carbon dioxide from carbon monoxide.

$$2CO \leftrightarrow C + CO_2 \qquad \text{Rxn. 8}$$

In addition to forming small molecules directly in the reactor, a number of other approaches may be used to provide the reactants to form the carbon allotropes. For example, steam reforming of hydrocarbons and other organic chemicals may be used. In these reactions, shown in Rxns. 9 and 10, a mixture of CO and hydrogen, called syngas, is formed.

$$C_nH_{2m} + nH_2O \leftrightarrow nCO + (m+n)H_2 \qquad \text{Rxn. 9}$$

$$C_nH_{2m}O_q + (n-q)H_2O \leftrightarrow nCO + (m+n-q)H_2 \qquad \text{Rxn. 10}$$

At the reaction temperatures shown in the triangular diagram 200, the syngas forms carbon allotropes via the second step of the Bosch reaction mechanism, shown in Rxn. 7.

As is apparent in the reactions shown above, there is a multitude of starting points for the production of carbon allotropes, such as CNTs. However, the reactions can be simplified by focusing on the conversion of the feedstock compounds into a mixture of small, thermodynamically stable, gases. These gases can then react to form carbon allotropes in the presence of a catalyst. This simplification can be performed by noting that a given hydrocarbon reacting with oxygen or with steam will be converted to carbon monoxide, carbon dioxide, water vapor, and hydrogen. Similarly, a given oxygenate reacting with itself, or with oxygen or steam, will also be converted to carbon monoxide, carbon dioxide, water vapor, and hydrogen. The ultimate mixture of small thermodynamically stable gases can be determined by performing equilibrium calculations on the reactions described above.

The gas mixture can then be converted to carbon allotropes in the Boudouard Reaction shown in Rxn. 8, step two of the Bosch reaction shown in Rxn. 7, the methane pyrolysis reaction shown in Rxn. 2, or some combinations of these. As all of these reactions produce carbon allotropes, they may be used to predict the carbon activity as a function of the composition of carbon monoxide, carbon dioxide, hydrogen, water vapor, methane, or the like, which are produced by some previous thermal decomposition reaction.

Oxidation Poisoning of Metal Catalysts

Another aspect of the catalytic reaction to produce carbon allotropes is that certain gas compositions and temperatures will oxidize the metal catalyst used in the reaction, rendering it ineffective for further catalytic reaction, as shown in Rxn. 11. The point where oxygen causes a metal or alloy to oxidize depends upon its properties. For elemental metals, this is determined by the Gibbs free energy of formation of the oxide.

$$xM + yO_2 \leftrightarrow M_xO_{2y}$$  Rxn. 11

If a catalyst includes iron, there are various oxides that may be formed. The most common include Wüstite (FeO), magnetite ($Fe_3O_4$), and hematite ($Fe_2O_3$). Wüstite is thermodynamically favored at the temperatures and pressures shown in FIG. 2 and forms by the reaction shown in Rxn. 12.

$$Fe + \tfrac{1}{2}O_2 \leftrightarrow FeO$$  Rxn. 12

An equilibrium constant, $K_{FeO}$, for Rxn 12 can be determined by the formula shown in Eqn. 4.

$$K_{FeO} = \exp[-\Delta G_{FeO}/(R_g T)] = [P_{O_2}/P_T]^{1/2}$$  Eqn. 4

In Eqn. 4, $\Delta G_{FEO}$ is the Gibbs free energy of iron oxidation to Wüstite which is a function of temperature, $R_g$ is the gas constant, T is the absolute temperature, $P_{O_2}$ is the partial pressure of oxygen ($O_2$), and $P_T$ is the total pressure of the system. The ratio, $P_{O_2}/P_T$, is simply the mole fraction of $O_2$ in the system. Using this equation, the partial pressure of oxygen that will initiate the oxidation of iron at any temperature can be identified.

The partial pressure of oxygen can be obtained from one of the fast reaction equilibria presented in Eqns. 5 and 6.

$$H_2O \leftrightarrow H_2 + 1/2\, O_2,\ P_{O2} = P_T \sqrt{K_{H2O}\frac{Y_{H2O}}{Y_{H2}}}$$  Eqn. 5

$$CO_2 \leftrightarrow CO + 1/2\, O_2,\ P_{O2} = P_T \sqrt{K_{CO2}\frac{Y_{CO2}}{Y_{CO}}}$$  Eqn. 6

In these equilibria calculations, $K_i$ is the equilibrium constant, a function of temperature, for the decomposition of gas i. As shown by Eqns. 5 and 6, the partial pressure of oxygen is controlled by either the mole fraction ratio of water vapor to hydrogen or the mole fraction ratio of carbon dioxide to carbon monoxide at a given temperature.

As shown in Eqns. 1-6, the mole fraction ratios are important for determining both the partial pressure of oxygen and defining the carbon activity for the Boudouard and Bosch reaction mechanisms. For example, the mole fraction ratio sets both the carbon activity and the partial pressure of oxygen, so that there will be a given activity of carbon that will initiate the oxidation of the metal catalyst.

As the pyrolysis reactions are endothermic, their zone of influence is near the H 204 apex of the triangle diagram 200, where the temperature lines curve, inverting the temperature sequence as the amount of carbon in the system increases. As a result, a zone 216 near the C—H edge 208 may be delineated in the triangle near the H apex, where pyrolysis reactions dominate over Bosch reactions. As the transition point changes as the temperature of the system changes, two lines 218 and 220 can be used to indicate the edge of the zone 216, depending on the temperature. The first line 218 delineates the zone 216 at about 1173.45 K (about 900° C.), while the second line 220 delineates the zone 216 at about 973.15 K (about 700° C.). The pyrolysis reactions dominate over the Bosch reactions in the zone between either of the lines 218 or 220 and the C—H edge 208.

Further, from the Ac produced by both the Bosch second step and the Boudouard reactions, a zone near the C—O edge 210 can be identified at which there is an equal probability for the first solid carbon allotropes to be produced by either reaction, based on the thermodynamics. One edge of this zone can be delineated by a first line 222 in the triangle diagram 200. Further, as discussed above, there is a point at which the second step of the Bosch reaction generates sufficient water to cause the partial pressure of oxygen to be sufficiently high that the iron catalyst will oxidize to Wüstite. At this point 224 the first line 222 becomes dotted and a second line 226, at a fixed hydrogen (H) content of about 0.14 for FeO, limits the Boudouard zone at about 1 atm system pressure. The Boudouard zone 228 dominates over the Bosch reaction at reaction conditions above and to the right of the first line 222 and to the right of the second line 222 (FeO oxidation).

CONCLUSION

The calculations discussed with respect to FIG. 2 identify carbon activity as the driving force for the production of carbon allotropes, such as CNTs. Thus, in embodiments, various reaction mixtures in the C—H—O system can be reduced to a prediction of the carbon activity using three carbon forming reactions that are applicable on the C—H edge 208, C—O edge 210, and the central portion of the triangular diagram of the C—H—O system. Carbon activities larger than about 1.0 produces carbon by each of the three carbon forming reactions. In some cases the carbon activity is a predictor of the transformation of iron to Wüstite, FeO. In these cases, the carbon activity where iron oxidizes will limit the carbon activity range where carbon can form to values larger than about 1.0. In the case of the Bosch second step reaction with equimolar CO:$H_2$ feed at about 973.15 K (about 700° C.) the carbon activity is limited to values larger than 35 for example.

Further, the calculations show clearly delineated zones where pyrolysis (zone 216) and Boudouard reactions (zone 228) dominate on the C—H edge 208 and C—O edge 210, respectively, of the triangle diagram 200. This also shows that experimental conditions in the central part of the triangular diagram of the C—H—O system define a Bosch reaction region 230 that provides the largest reactor conversion resulting in faster production and higher yields than reactions on the C—H edge 208 or C—O edge 210 of the triangular diagram 200. In this region, the concentration of the carbon is set by the Ac, and is greater than about 10%. Further, the oxygen content is greater than about 10%, and the hydrogen concentration is greater than about 20%.

Reaction Systems

Figure 3:
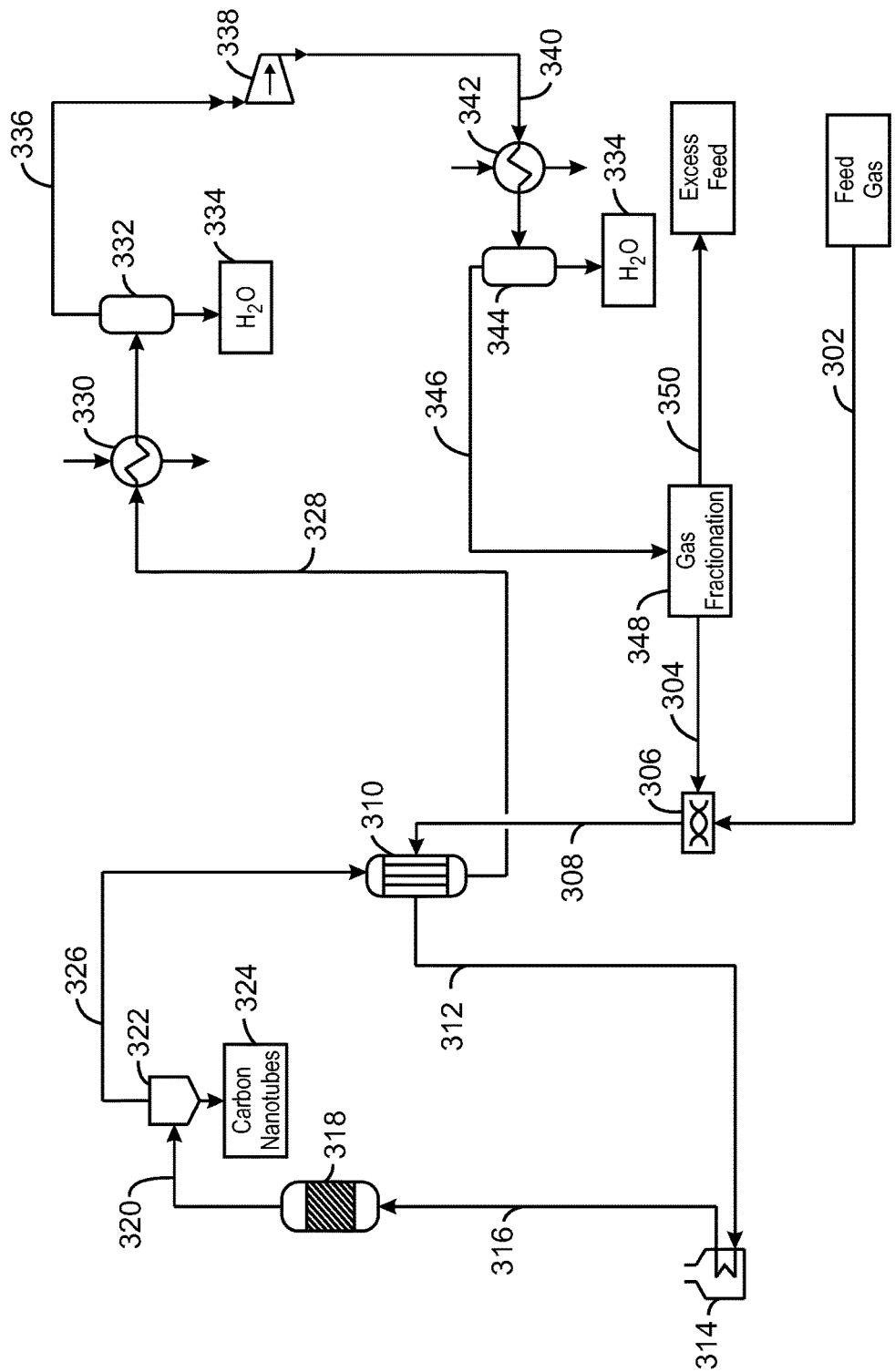
FIG. 3 is a simplified process flow diagram of a one reactor system for making carbon nanotubes (CNTs) from a gas feed that includes carbon dioxide and methane.

FIG. 3 is a simplified process flow diagram of a one reactor system 300 for making carbon nanotubes (CNTs) from a gas feed that includes carbon dioxide and methane. As shown, the one reactor system 300 can be used for feed gas 302 that is higher in $CO_2$ or higher in $CH_4$. More specific reactor systems are discussed with respect to FIGS. 5 and 6. In the one reactor system 300, the feed gas 302 is combined with a recycle gas 304 that has an enhanced concentration of the lesser gas. This may be done using a static mixer 306.

The combined gas stream 308 is passed through a heat exchanger 310 or set of heat exchangers 310 in series to be heated by a reactor effluent stream. The temperature can be raised from a near ambient temperature, as defined herein, to an appropriate reaction temperature, such as about 500° C. (930° F.), about 600° C. (about 1112° F.), about 700° C. (about 1292° F.), about 800° C. (about 1472° F.), or about 900° C. (about 1652° F.) for the heated gas stream 312. This temperature may be sufficient for maintaining the reaction during continuous operations. However, part of the heat may be provided by a package heater 314, which may be especially useful for adding heat to bring the reactants up to temperature during start-up. The hot gas stream 316 is then introduced into a fluidized bed reactor 318. A general fluidized bed reactor that may be used in embodiments is discussed with respect to FIG. 7. In the fluidized bed reactor 318, CNTs are formed on catalyst particles. The catalyst particles and reactions are also discussed with respect to FIG. 6.

The CNTs are carried from the first fluidized bed reactor 318 in a reactor effluent stream 320. The reactor effluent stream 320 may be at an elevated temperature, for example, about 600° C. (about 1112° F.), about 700° C. (about 1292° F.), about 800° C. (about 1472° F.), or about 900° C. (about 1652° F.), and may be cooled by exchanging heat with the combined gas stream 308, for example, providing some or all of the heat used to heat the reactants. Either prior to or after cooling, the reactor effluent stream 320 is passed through a separation system 322 to isolate the CNTs 324.

In some embodiments, the separation system 322 may contain a catalyst separation device, such as a cyclonic separation device or a magnetic separation device, for removing excess catalysts, from the reactor effluent stream 320. The removed catalysts may then be returned to the fluidized bed reactor 318.

The separation system 322 may also contain one or more separation devices configured to isolate the CNTs 324 from the reactor effluent stream 320 and generate a waste gas stream 326 including gaseous components from the reactor effluent stream 320. For example, the waste gas stream 326 may include waste gas from the fluidized bed reactor 318, as well as metal residues and other impurities. The CNTs 324 that are isolated from the reactor effluent stream 320 may be sent to the market.

In various embodiments, the separation system 322 may include a gravity separation vessel, such as a drift separator, or a separator based on centripetal force, such as a cyclonic separator, or a multicyclonic separator, among others. The separation system 322 may also include a magnetic separation vessel or an electrostatic separation vessel, such as an electrostatic precipitator. Further, the separation system 322 may contain any type of separation device that is capable of separating the CNTs 324 from the waste gas stream 326.

In some embodiments, the separation system 322 may include a filter device for aiding in the purification of the CNTs 324. This is discussed further with respect to FIG. 8.

The isolation of the CNTs within the separation system may result in the generation of the waste gas stream 326, as discussed above. The waste gas stream 326 can used to provide heat to the combined gas stream 308 in the heat exchanger 310. The carbon may also be removed within the separation system 322 at lower temperatures than the waste gas stream 326.

After providing heat to the combined gas stream 308, the cooled waste stream 328 is passed through an ambient temperature heat exchanger 330 and then fed to a separation vessel 332. Water 334 settles in the separation vessel 332 and is removed from the bottom. The resulting gas stream 336 may be significantly cooler, for example, at about 30° C., about 38° C. (about 100° F.), or about 40° C. and at a pressure of about 2500, kilopascals (kPa), about 3000 kPa, about 3720 kPa (about 240 psia), or about 4000 kPa. In one embodiment, the gas is then dried to a low dew point in a drier (not shown). The stream enters a compressor 338 that increases the pressure of the gas stream 336, for example, to about 5000 kPa, about 6000 kPa, about 7000 kPa, about 7,240 kPa (about 1050 psia), or about 8000 kPa, forming a high pressure stream 340 which is passed through another ambient temperature heat exchanger 342. From the ambient temperature heat exchanger 342, the high pressure stream 340 is fed to a separation vessel 344 for removal of any remaining water 334, for example, if a drier has not been used.

In embodiments in which the $CO_2$ is in excess in the feed gas 302, the dried gas stream 346 is then sent to a gas fractionation system 348, which separates the excess feed 350 from the recycle gas 304. In reaction systems 300 based on a proportionate excess of $CO_2$, the excess feed 350 may primarily include $CO_2$, and the recycle gas 304 may primarily include $CH_4$. In reaction systems 300 based on a proportionate excess of $CH_4$, the excess feed 350 will not have a substantial $CO_2$ content, and a portion may be recycled without further purification. In some embodiments, a portion of the excess feed 350, the recycle gas 304, or both may be tapped to provide a fuel gas stream, a purge gas stream, or both for use in the plant.

The reaction conditions used can cause significant degradation of metal surfaces, as indicated by choice of the catalyst itself, which may include carbon or stainless steel in various forms. Accordingly, the process may be designed to decrease the amount of metal exposed to the process conditions, as discussed further with respect to the following figures.

Figure 4:
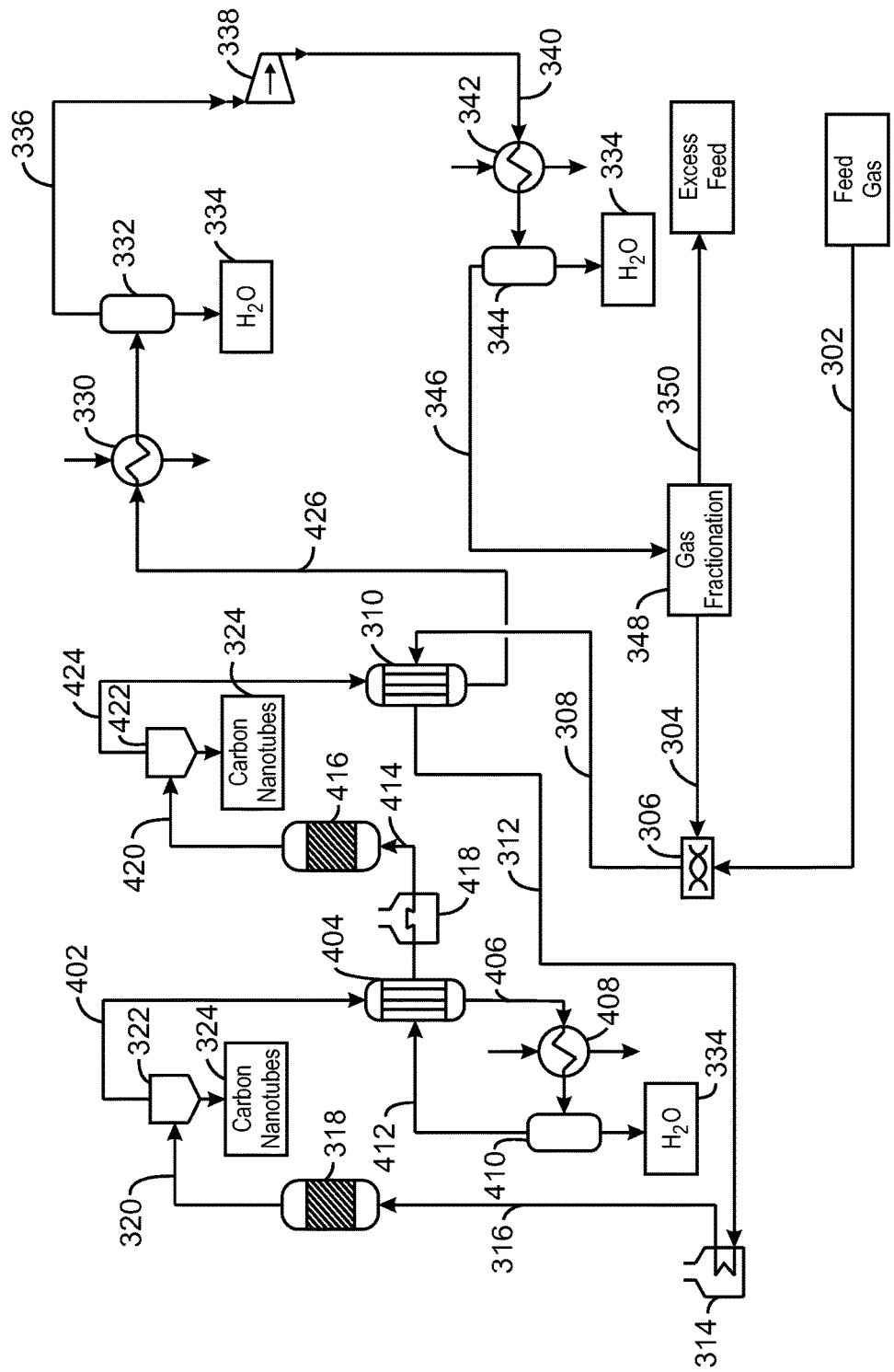
FIG. 4 is a simplified process flow diagram of a two reactor system for making CNTs from a gas feed that includes carbon dioxide and methane.

FIG. 4 is a simplified process flow diagram of a two reactor system 400 for making CNTs from a gas feed that includes carbon dioxide and methane. Like numbered items are as discussed with respect to FIG. 3. In the two reactor system 400, the resulting waste gas stream 402 is used to provide heat in a heat exchanger 404. The carbon may also be removed in secondary separation devices at lower temperatures than the waste gas stream 402. This is particularly easy to do where multiple heat exchangers in parallel may be used to cool the waste gas stream 402 while heating the feed gas to the next reactor in a sequence. Normally, all of the carbon solids will be removed by separation device(s) prior to the condensation of any of the water vapor present in the waste gas stream 402.

The cooled waste gas stream 406 is then passed through an ambient temperature heat exchanger 408, which further cools the cooled waste gas stream 406 and results in the bulk of the water formed condensing as a liquid, which is then fed to a separation vessel 410. Water 334 is removed from the separation vessel, and a reactant stream 412 exits the top of the separation vessel 410 at about 30° C., about 38° C. (about 100° F.), about 40° C., or about 50° C.

The reactant stream 412 passes through the heat exchanger 404 and is heated by waste heat from the waste gas stream 402. The heated stream 414 is the fed to a second fluidized bed reactor 416 in which additional CNTs 324 are formed. However, the heated stream 414 may not be at a sufficiently high temperature, e.g., greater than about 850° C. (about 1562° F.), to form CNTs 324 in the second fluidized bed reactor 416. To increase the temperature of the heated stream 414, a second package heater 418 may be used. The second package heater 418 may be a separate heating zone in the first package heater 314. In some embodiments, a second reactor effluent stream 420 is used to provide heat to the heated stream 414. The second reactor effluent stream 420 is then fed to a second separation system 422 to isolate the CNTs 324 from the second reactor effluent stream 420. In various embodiments, the second separation system 422 may include any number of separation devices, such as those discussed with respect to the separation system 322. The resulting waste gas stream 424 is used to provide heat to the combined gas stream 308 as it passes through the heat exchanger 310.

Although only two fluidized bed reactors 318 and 416 are shown in this embodiment, the reaction system 400 may contain more reactors if desired. The determination of the number of reactors can be based on the concentration of the feedstocks and the desired remaining amount of each feedstock. In some circumstances, three, four, or more reactors may be used in sequence, in which an effluent stream from each reactor provides heat to a feed gas for the next reactor in the sequence. Further, the reactors do not have to be fluidized bed reactors, as other configurations may be used in other embodiments. For example, a fixed bed reactor, a tubular reactor, a continuous feed reactor, or any number of other configurations may be used. As noted, in embodiments in which the $CH_4$ is in excess, the gas fractionation system 348 can be replaced with a manifold that can divide the dried gas stream 346 into the excess feed 350 and a recycle gas 304.

Figure 5:
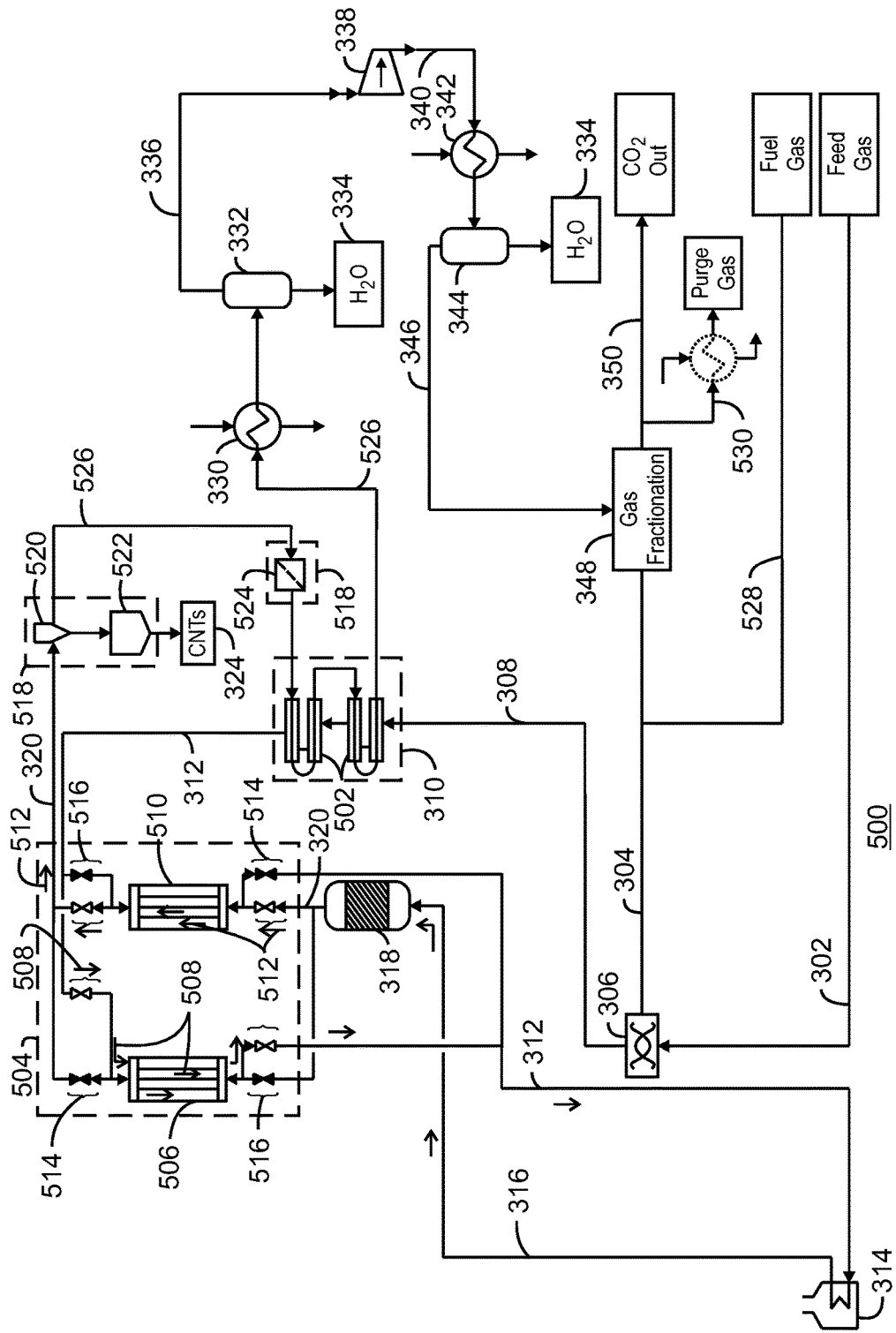
FIG. 5 is a simplified process flow diagram of a one reactor system for making CNTs from a gas feed that includes carbon dioxide and methane, in which the carbon dioxide is in excess.

FIG. 5 is a simplified process flow diagram of a one reactor system 500 for making CNTs from a gas feed that includes carbon dioxide and methane, in which the carbon dioxide is in excess. In FIG. 5, like number items are as described with respect to FIG. 3. As for FIG. 3, the feed gas 302 passes through a static mixer 306 where it is combined with a recycle gas 304, which is high in methane. The combined gas stream 308 is passed through a heat exchanger 310, for example, including multiple shell and tube heat exchangers 502. The main difference between the more detailed process flow diagram of FIG. 5 and that of FIG. 3 is the use of heat exchangers to cool the reactor effluent stream 320 prior to separating the CNTs from the reactor effluent stream 320.

In this embodiment, the heated gas stream 312 is raised to a temperature of about 300° C., about 400° C., about 427° C. (about 800° F.), or about 500° C. in the heat exchanger 310 prior to flowing through a second heat exchanger 504. In the second heat exchanger 504, the heated gas stream 312 flows through a first ceramic block heat exchanger 506, as indicated by arrow 508. Heat stored in the first ceramic block heat exchanger 506 is exchanged to the heated gas stream 312 and may increase the temperature to between about 500° C. (about 932° F. and to about 550° C. (about 1022° F.). In another embodiment, the feed is heated to between about 700° C. (about 1292° F.) to about 750° C. (about 1382° F.). In another embodiment, the feed is heated to between about 800° C. (about 1472° F.) to about 850° C. (about 1562° F.).

While the first ceramic block heat exchanger 506 is used to heat the heated gas stream 312, a second ceramic block heater 510 is used to cool the reactor effluent stream 320 by flowing this stream through the second ceramic block heater 510, as indicated by arrows 512. When the second ceramic block heat exchanger 510 reaches a selected temperature, or the first ceramic block heat exchanger 506 drops to a selected temperature, the positions of the inlet valves 514 and outlet valves 516 are changed. In other words, open valves are closed and closed valves are opened. The change in the positions of the valves changes which ceramic block heat exchanger 506 or 510 is being heated by the flow from the reactor 318 and which ceramic block heat exchanger 506 or 510 is used to heat the heated gas stream 312.

The heat may not be sufficient to increase the temperature sufficiently for reaction. Thus, as described with respect to FIG. 3, a package heater 314 can be used to further boost the temperature of the heated gas stream 312, forming the hot gas stream 316, which can be fed to the fluidized bed reactor 318. CNTs 324 are formed in the fluidized bed reactor 318, and carried out in the reactor effluent stream 320.

After flowing through the second ceramic block heater 510, the reactor effluent 320 is flowed to a separation system 518, which is used to remove the CNTs 324 from the reactor effluent 320. In this embodiment, the separation system 518 for the CNTs 324 includes a cyclonic separator 520, a lock hopper 522, and a filter 524. However, the separation system 518 may also include any number of other separation devices, such as those discussed with respect to the separation system 322, arranged in any type of configuration. After the majority of the CNTs are removed by the cyclonic separator 520 and deposited into the lock hopper 522, the filter 524 is used to remove remaining CNTs 324 from the waste gas stream 526. This may help to prevent plugging, or other problems, caused by residual CNTs 324 in the waste gas stream 526. The filter 524 can include bag filters, sintered metal filters, and sintered ceramic filters, among other types. From the CNT separation systems 518, the CNTs 324 may be directed to a packaging system, as discussed in further detail with respect to FIG. 12. After the filter 524, the waste gas stream 526 is flowed through the heat exchanger 310 before flowing to the ambient temperature heat exchanger 330 and then fed to a separation vessel 332 for separation of the water. After flowing through the separation vessel 332, the flow is as described with respect to FIG. 3.

In this embodiment, two extra streams may be provided from the separated streams out of the gas fractionation system 348. A fuel gas stream 528 may be taken from the recycle gas 304 to meet internal fuel demands and could, if warranted, be sent to a power plant. A purge gas stream 530 may be taken from the $CO_2$ outlet stream, which can be used to purge various pieces of equipment, such as the filter 524 or cyclone 520.

Reactor Systems

Figure 6:
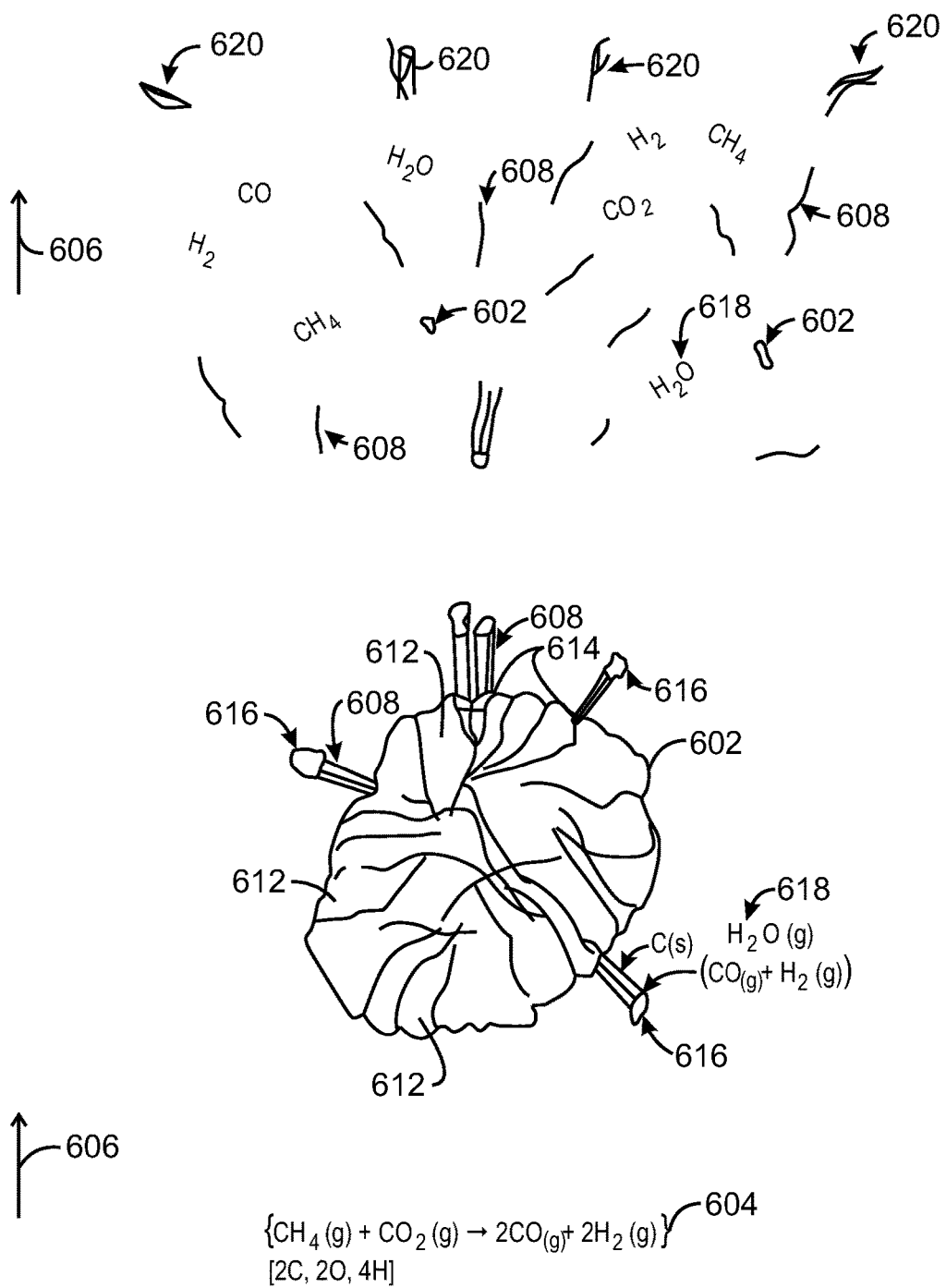
FIG. 6 is a schematic of a catalytic reaction for the formation of CNTs on a catalyst particle.

FIG. 6 is a schematic of a catalytic reaction 600 for the formation of CNTs on a catalyst particle 602. In some embodiments, the catalyst reaction 600 takes place in a fluidized bed reactor discussed further with respect to FIG. 7. An initial reaction 604 between a portion of the compounds containing C, O, and H in the hot gas feed stream 606, such as the $CH_4$ and the $CO_2$, results in the formation of CO and $H_2$. Excess amounts of the source gases continue to flow through the reactor, helping to fluidize the bed and carrying away CNTs 608 and catalyst particles 610.

The reactions that form the CNTs 608 take place on the catalyst particle 602. Without being bound by theory, a nucleus of iron atoms of sufficient size on the catalyst surface may form the nucleating point for the growth of the carbon products on the catalyst particle 602. Many parameters affect the morphology of the final product, including reaction temperature, pressure, and feed gas composition.

The CO and $H_2$ react on the surface at point 614, lifting active catalyst particles 616 off the catalyst particle 602, and forming $H_2O$ 618 and the solid carbon of the CNTs 608. The CNTs 608 then break off from the catalyst particle 602. Larger catalyst particles 602 can be captured and returned to the reactor, for example, by a catalyst separator discussed further with respect to FIG. 7, while very fine catalyst particles 602 will be carried out with the CNTs 608. The final product will include about 70 mol % solid carbon and about 15 mol % metal, about 80 mol % solid carbon and about 10 mol % metal, about 90 mol % solid carbon and about 7 mol % metal, or about 95 mol % solid carbon and about 5 mol % metal. The CNTs 608 will often agglomerate to form clusters 620, which are the common form of the final product. Some amount of the CO and $H_2$ passes through the reactor without reacting and are contaminants in the reactor effluent streams.

As the reaction proceeds, the catalyst particle 602 is degraded and finally consumed. Accordingly, the reaction may be described as a metal dusting reaction. In some embodiments, metal surfaces are protected from attack by a ceramic lining, since the metal surfaces in contact with the reaction conditions would not only degrade, but may also result in the formation of poorer quality products.

The catalyst particle 602 can include any number of metals from different IUPAC Groups on the periodic table, such as Group 10 (e.g., nickel), Group 8 (e.g., iron or ruthenium), Group 9 (e.g., cobalt), or Group 6 (e.g., chromium or molybdenum), among others. Other metals that may be present include Group 7 metals (e.g., manganese), or Group 5 metals (e.g., cobalt), among others. It can be understood that the metals listed above are merely exemplary of the Groups mentioned and other metals from those Groups may be included. However, the catalytic sites on the catalyst particles 602 are principally composed of iron atoms. In one embodiment, the catalyst particles 602 include metal shots, for example, groups of about 25-50 mesh metal beads that are used for shot blasting.

Figure 7:
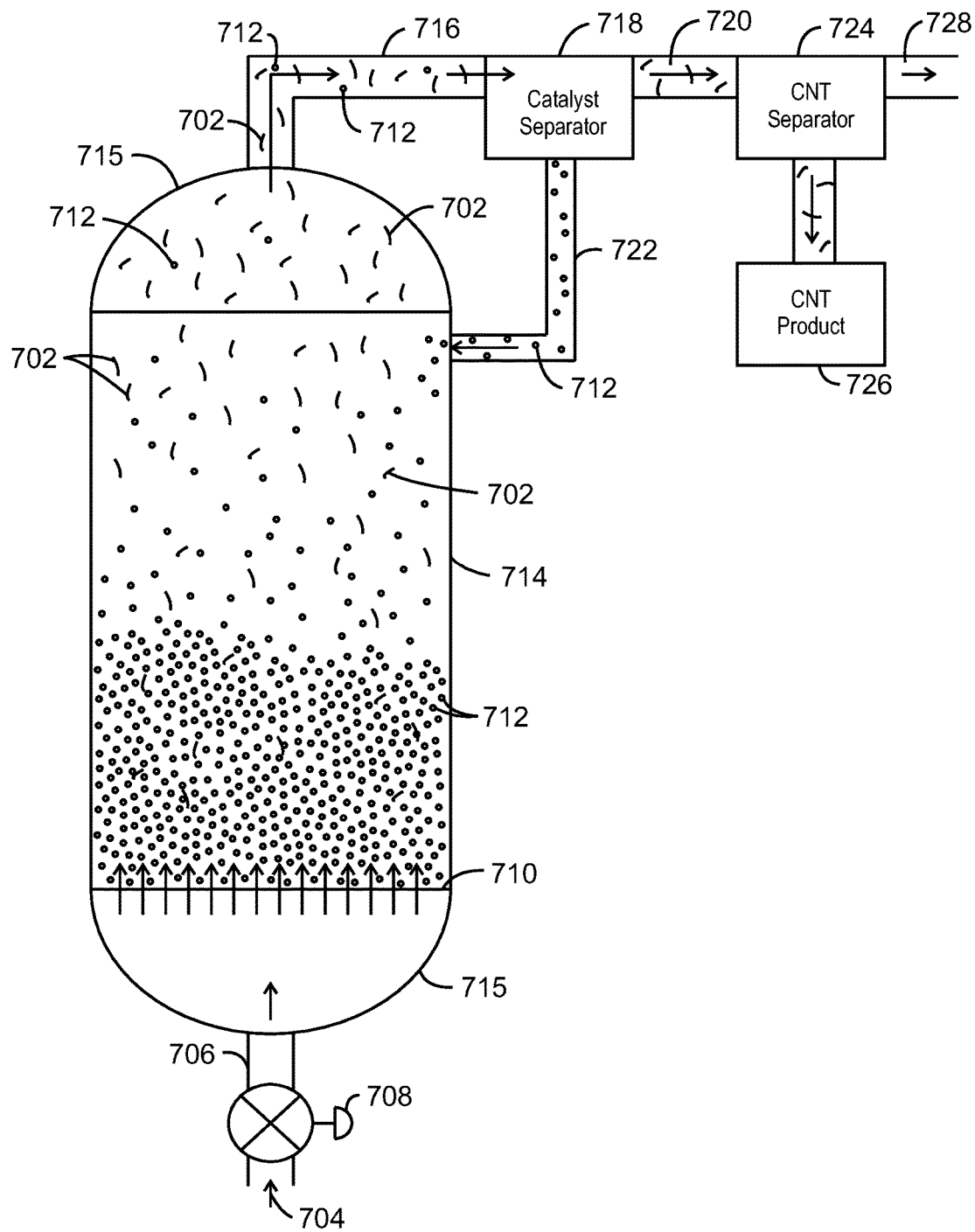
FIG. 7 is a drawing of a fluidized bed reactor for forming CNTs.

FIG. 7 is a drawing of a fluidized bed reactor 700 for forming CNTs 702. A hot gas feed stream 704 is fed through a line 706 into the bottom of the fluidized bed reactor 700. A control valve 708 may be used to regulate the flow of the hot gas feed stream 704 into the reactor. The hot gas feed stream 704 flows through a distributor plate 710 and will fluidize a bed of catalyst particles 712 held in place by the reactor walls 714. As used herein, "fluidize" means that the catalyst particles 712 will flow around each other to let gas bubbles through, providing a fluid-like flow behavior. As discussed herein, the reaction conditions are very harsh to any exposed metal surface, as the metal surface will perform as a catalyst for the reaction. Thus, the reaction will result in the slow degradation of an exposed metal surface. Accordingly, the interior surface of the reactor, including the reactor walls 714 and head 715, as well as the distributor plate 710, and other parts, can be made of a protective material, such as ceramic or gold, to protect the surfaces.

As the hot gas feed stream 704 flows through the fluidized bed of catalyst particles 712, CNTs 702 will form from catalyst particles 712. The flowing hot gas feed stream 704 carries the CNTs 702 into an overhead line 716 where they are removed from the reactor 700. Depending on the flow rate, for example, as adjusted by the control valve 708, some amount of catalyst particles 712 may be carried into the overhead line 716. In addition, the flowing hot gas feed stream 704 may include gaseous components, metal residues, and other impurities that are also carried into the overhead line 716 along with the CNTs 702.

In various embodiments, a catalyst separator 718 may be configured to separate catalyst particles 712 of a certain size or larger from a reactor effluent stream 720 and return them to the reactor 700 through a recycle line 722. Any number of configurations may be used for the catalyst separator, including a cyclonic separator, a magnetic separator, a settling tank, or the like.

Further, a CNT separator 724 may be configured to isolate the CNTs 702 from the reactor effluent stream 720 in order to obtain a final CNT product 726. A stream 728 containing gaseous components, some residual CNTs, or other impurities is generated from the reactor effluent stream 720 by the isolation of the CNTs 702. In some embodiments, the CNT separator 724 may include a cyclonic separator, a multicyclonic separator, an electrostatic precipitator, a magnetic separator, an inertial separator, or a gravity separator, among others. The CNT separator may also include a filter, such as a sintered ceramic filter or a sintered metal filter, among others.

Figure 8:
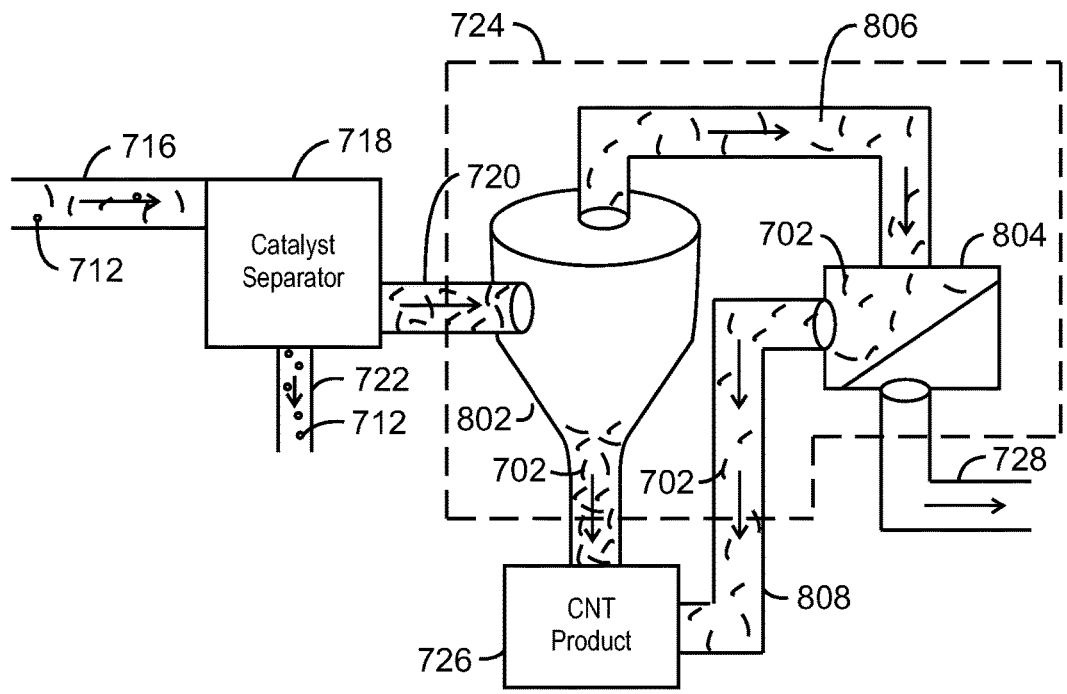
FIG. 8 is a schematic of a separation system in which a cyclonic separator and a filter are used to isolate the CNTs from the reactor effluent stream.

FIG. 8 is a schematic of a separation system 800 in which a cyclonic separator 802 and a filter 804 are used to isolate the CNTs 702 from the reactor effluent stream 720. Like numbered items are as described with respect to FIG. 7. The cyclonic separator 802 and the filter 804 may be implemented within the CNT separator 724 discussed with respect to FIG. 7.

In various embodiments, the walls of the cyclonic separator 802 may be coated with a protective material with a high temperature resistance, such as ceramic or gold. This may help to protect the cyclonic separator 802 from degradation as a result of the high-temperature of the reactor effluent stream 720.

As the reactor effluent stream 720 enters the cyclonic separator 802, a swirl element within the cyclonic separator 802 may impart a radial acceleration and a tangential velocity component to the reactor effluent stream 720 through the rotation of twisted swirl vanes. The swirl vanes may be arranged parallel or in series on the swirl element. The swirling of the reactor effluent stream 720 may cause the CNTs 702, which are heavier and denser than the other particles within the reactor effluent stream 720, to migrate to the outer rim of the cyclonic separator 802 and begin traveling in a wide circular path, while the other particles may migrate towards the center of the cyclonic separator 802 and begin traveling in a narrow circular path. As the reactor effluent stream 720 nears the end of the cyclonic separator 802, the CNTs 702 may be captured and sent out of the cyclonic separator 802 as the final CNT product 726. A stream 806 containing gaseous components, as well as some amount of the CNTs 702 that were not captured by the cyclonic separator 802, may also be sent out of the cyclonic separator 802.

In various embodiments, the stream 806 may be sent to the filter 804. The filter 804 may be used to remove any remaining CNTs 702 from the stream 806. The removed CNTs 702 may be sent through a CNT feed line 806 to be combined with the final CNT product 726. The stream 728, which may be the final waste stream from the separation process, may be sent out of the separation system 724 for further processing.

The filter 804 may include any of a number of different types of filters. For example, the filter 804 may be a sintered ceramic filter or a sintered metal filter, which may be capable of withstanding the high temperatures of the stream 806. The filter 804 may also be a fabric bag filter or a fluidized bed filter, among others. The filter 804 may be configured to perform a self-cleaning procedure to remove any remaining CNTs. In some embodiments, the separation system 724 may include two filters, wherein one filter may be online while the other filter is offline and performing the self-cleaning procedure.

Figure 9:
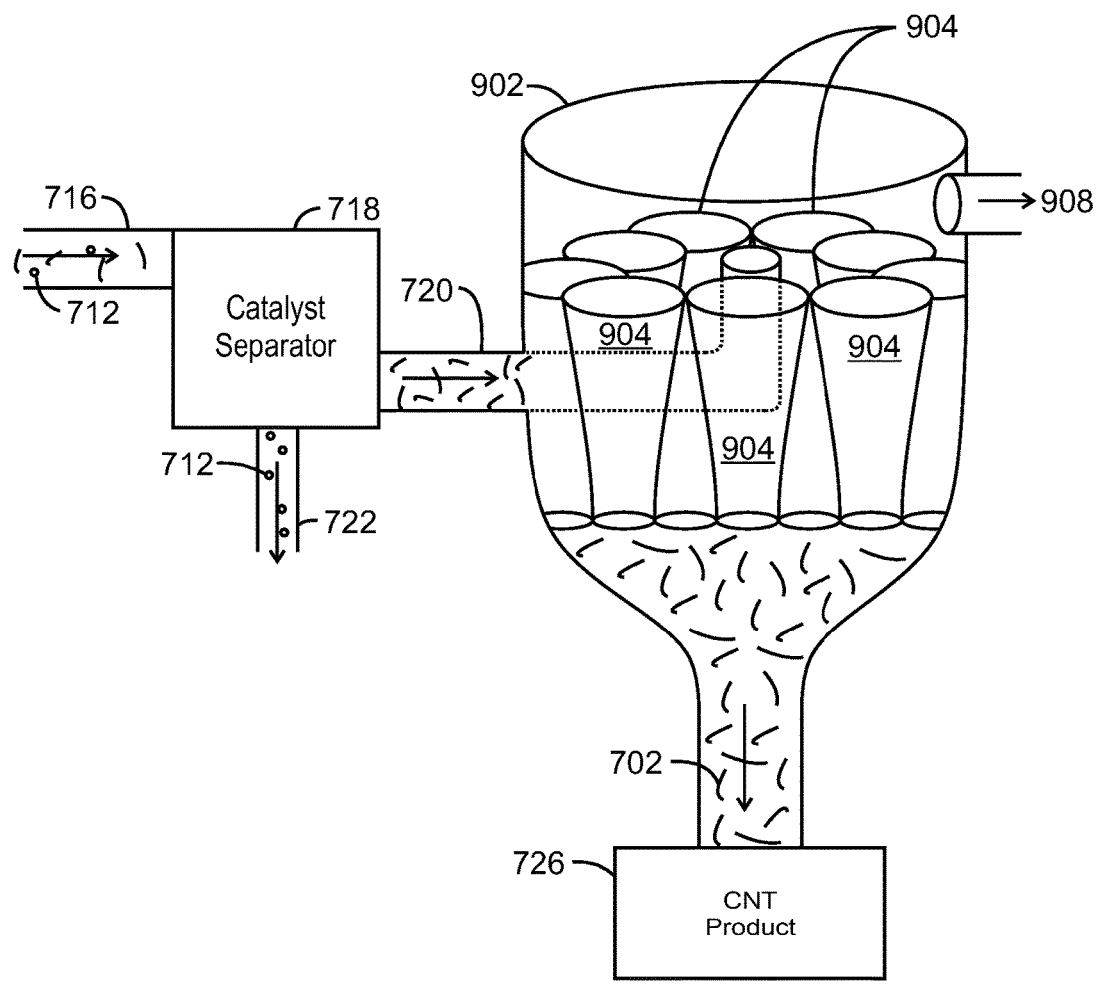
FIG. 9 is a schematic of a separation system in which a multicyclonic separator is used to isolate the CNTs from the reactor effluent stream.

FIG. 9 is a schematic of a separation system 900 in which a multicyclonic separator 902 is used to isolate the CNTs 702 from the reactor effluent stream 720. The multicyclonic separator 902 functions similarly to the cyclonic separator 802. However, the multicyclonic separator 902 includes multiple cyclones 904 arranged in a parallel configuration.

In various embodiments, the walls of the cyclones 904 are coated with a protective material with a high temperature resistance, such as ceramic or gold. This may help to protect the cyclones 904 from degradation as a result of the high-temperature of the reactor effluent stream 720.

As the reactor effluent stream 720 enters the multicyclonic separator 902, the reactor effluent stream 720 is distributed between the cyclones 904. In various embodiments, the reactor effluent stream 720 is directed to the center of the cyclones 904, and may be injected into each of the cyclones 904 near the top. A swirl element within each of the cyclones 904 may impart a radial acceleration and a tangential velocity component to the reactor effluent stream 720 through the rotation of twisted swirl vanes. The swirl vanes may be arranged parallel or in series on the swirl element. The swirling of the reactor effluent stream 720 may cause the CNTs 702, which are heavier and denser than the other particles within the reactor effluent stream 720, to migrate to the outer rim of each of the cyclones 904 and begin traveling in a wide circular path, while the other particles may migrate towards the center of each of the cyclones 904 and begin traveling in a narrow circular path. As the reactor effluent stream 720 nears the end of each of the cyclones 904, the CNTs 702 may be captured and sent out of each of the cyclones 904 into a collection chamber 906. From the collection chamber 906, the CNTs 702 may be sent out of the multicyclonic separator 902 as the final CNT product 726.

A stream 908 containing gaseous components, including some amount of the CNTs 702 that were not captured by the cyclones 904, may also be sent out of the multicyclonic separator 902. In various embodiments, the stream 908 may be sent to the filter 804, as discussed above with respect to FIG. 8. The filter 804 may be used to remove any remaining CNTs 702 from the stream 908.

Figure 10:
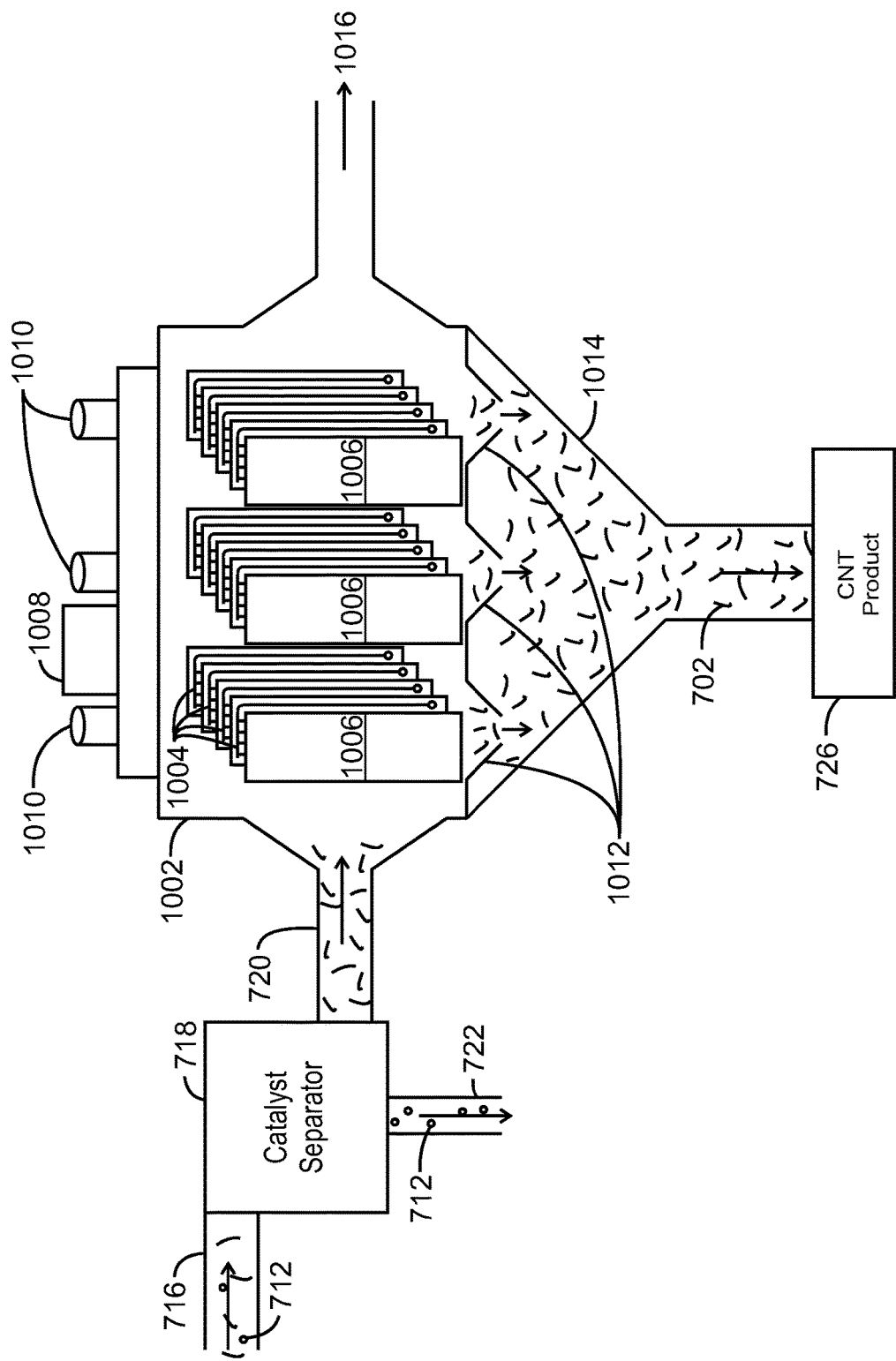
FIG. 10 is a schematic of a separation system in which an electrostatic precipitator is used to isolate the CNTs from the reactor effluent stream.

FIG. 10 is a schematic of a separation system 1000 in which an electrostatic precipitator 1002 is used to isolate the CNTs 702 from the reactor effluent stream 720. The electrostatic precipitator 1002 may remove the CNTs 702 from the reactor effluent stream 720 using the force of an induced electrostatic charge.

The electrostatic precipitator 1002 may include a number of discharge electrodes 1004. The discharge electrodes 1004 may be a number of small-diameter metal wires that hang vertically and are attached together in rigid frames. In addition, the electrostatic precipitator 1002 may include collection electrodes 1006, which are stacks of large flat metal plates or tubes that are oriented vertically. The collection electrodes 1006 have a charge that is the opposite of the charge of the discharge electrodes 1004. In some embodiments, the collection electrodes 1006 are spaced about 1 cm to 18 cm apart, depending on the amount of CNTs expected to be present. The reactor effluent stream 720 may flow horizontally through the spaces between the discharge electrodes 1004, and then pass through the collection electrodes 1006.

High-voltage equipment 1008 may be used to apply a negative voltage of several thousand volts between the discharge electrodes 1004 and the collection electrodes 1006. The applied voltage may result in the ionization of the reactor effluent stream 720 as it flows around the discharge electrodes 1004 and the collection electrodes 1006. Negative ions may flow to the collection electrodes 1006 and charge the CNTs 702 within the reactor effluent stream 720. The CNTs 702, following the negative electric field created by the high-voltage equipment 1008, may then move to the collection electrodes 1006.

The CNTs 702 may build up on the collection electrodes 1006 and form a layer. The layer may be prevented from collapsing by the electrostatic pressure. A number of rappers 1010 may impart a vibration to the discharge electrodes 1004 and the collection electrodes 1006, resulting in the removal of the CNTs 702 from the collection electrodes 1006. In some embodiments, water sprayers (not shown) are also used periodically to remove the CNTs 702 from the collection electrodes 1006.

A number of hoppers 1012 located at the bottom of the electrostatic precipitator 1002 may be used to collect the CNTs 702 that are isolated from the reactor effluent stream 720. In addition, a large hopper 1014 may be used to combine and temporarily store the CNTs 702 that are collected within the hoppers 1012. The CNTs 702 may then be sent out of the electrostatic precipitator 1002 as the final CNT product 726.

Further, a stream 1016 containing gaseous components, including some amount of the CNTs 702 that were not captured by the collection electrodes 1006, may also be sent out of the electrostatic precipitator 1002. In various embodiments, the stream 1016 may be sent to the filter 804, as discussed above with respect to FIGS. 8 and 9. The filter 804 may be used to remove any remaining CNTs 702 from the stream 1016.

Packaging System

Figure 11:
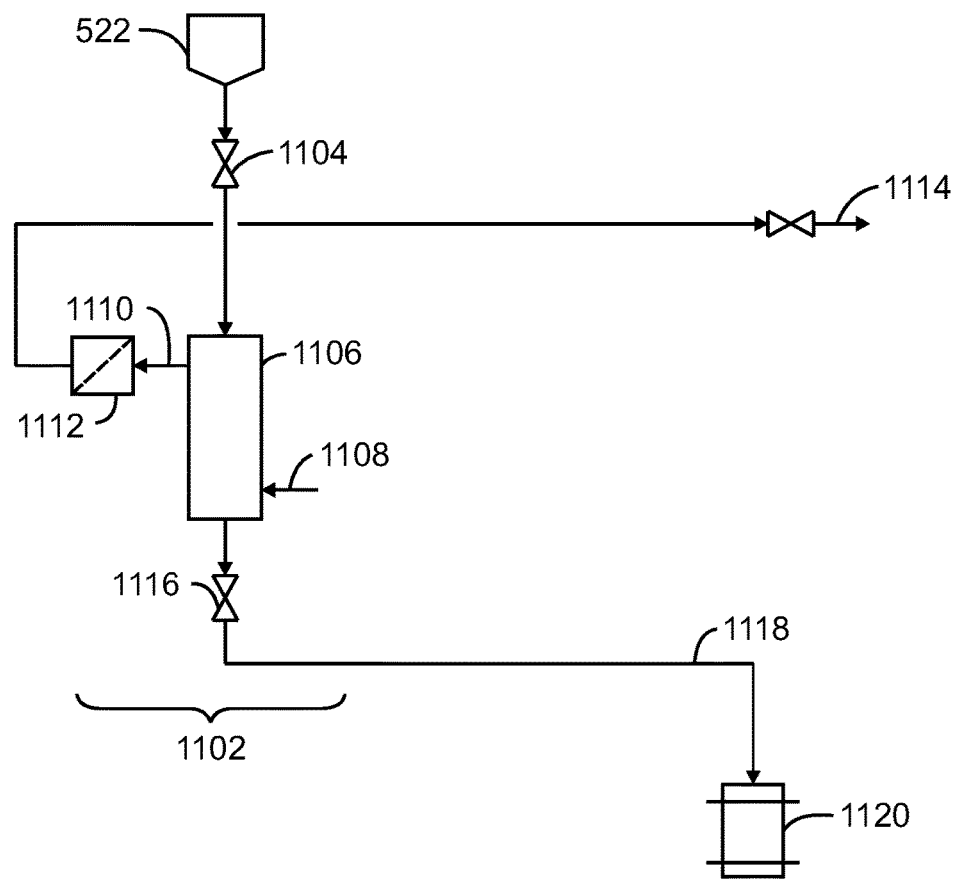
FIG. 11 is a simplified process flow diagram of a packaging system that can package CNTs separated from a reactor effluent stream from a one reactor system.

FIG. 11 is a simplified process flow diagram of a packaging system 1100 that can package CNTs separated from an effluent stream from a one reactor system. The packaging system 1100 overlaps the lock hopper 522 of the separation system 518 shown in FIG. 5, and is used to isolate the CNTs from the process for packaging.

The packaging system 1100 is part of a packaging train 1102. The packaging train 1102 may have a sampling valve 1104 to remove CNTs from the lock hopper 522. The sampling valve 1104 may be a rotary valve configured to allow a certain amount of CNTs and gas through during a portion of a rotation cycle. In some embodiments, the sampling valve 1104 may be a ball valve configured to open fully for a selected period of time to allow a selected amount of CNTs and gas through, prior to closing fully. The CNTs and gas are allowed to flow into a drum 1106 for purging and cooling.

After the sampling valve 1104 has closed, a purge stream 1108 may be opened into the drum 1106 to sweep out remaining gases, such as CO, $H_2$, $H_2O$, and $CH_4$. As noted, the purge stream 1108 may be taken from the $CO_2$ enriched side of the gas fractionation system, for example, as purge gas stream 530, discussed with respect to FIG. 5. The purge outlet stream 1110 will carry some amount of CNTs, and other fine particles, and may be passed through a filter 1112, prior to being sent back to the process as a purge return 1114. The filter 1112 may be a bag filter, cyclonic separator, or any other suitable separation system, such as the filter 804 discussed with respect to FIG. 8. After purging is completed, a packaging valve 1116 will open to allow a stream 1118 including CNTs to flow to a filling station 1120 to be packaged in drums or tanks for sale.

Method

Figure 12:
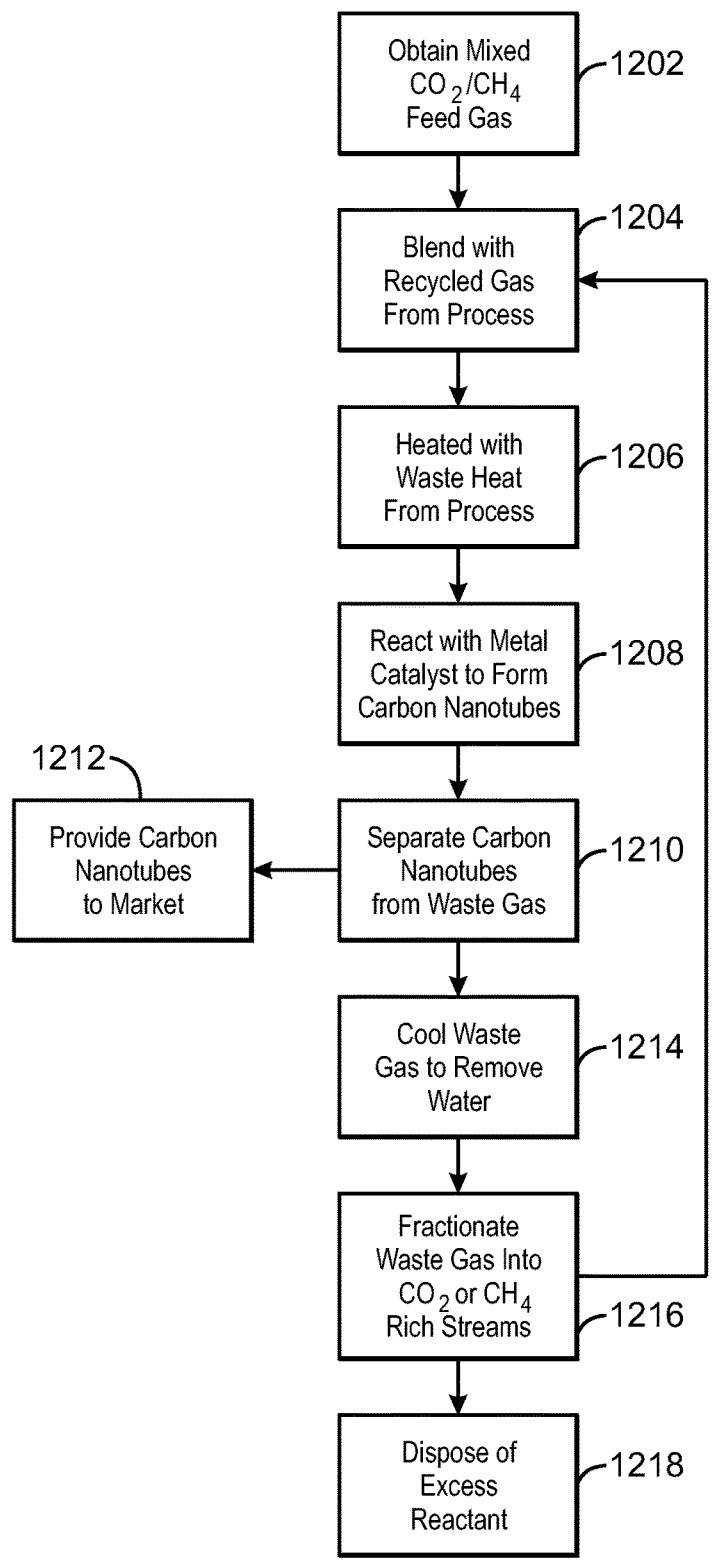
FIG. 12 is a process flow diagram of a method for generating CNTs from a feed gas that includes methane and carbon dioxide.

FIG. 12 is a process flow diagram showing a method 1200 for generating CNTs from a feed gas that includes methane and carbon dioxide. The method 1200 begins at block 1202, at which a mixed C, H, and O feedstock, such as a $CO_2/CH_4$ mixture, is obtained. The feed stock may be obtained from any number of sources. As mentioned, the feedstock may include a natural gas harvested from a sub-surface reservoir, an exhaust gas from a power generation plant, or any number of other gases from natural or plant sources. Further, other feedstocks may be used in embodiments, including other materials, such as syngas, CO, $H_2$, other hydrocarbons, and the like, as long as the overall feed C:H:O ratio falls within the boundary as shown in FIG. 2.

At block 1204, the feedstock is combined with a recycle gas obtained from the waste gases generated in the process. As described herein, the recycle gas may be obtained from the waste gases by gas fractionation, which could involve cryogenic low temperature distillation as well as any number of other techniques. At block 1206, the combined gas stream is heated with waste heat recovered from the reaction process. After heating, at block 1208, the combined gas stream is reacted with a metal catalyst in a reactor to form the CNTs. At block 1210, the CNTs are separated from the waste gas. At block 1212, the separated CNTs are purged, cooled, and packaged to be sent to market.

At block 1214, the waste gas is cooled to remove excess water formed during the reaction. As the process is conducted at high temperatures and pressures, an ambient temperature heat exchanger provides sufficient cooling to condense out the water vapor. Some of the cooling from block 1214 can be used to provide some of the heating in block 1206. The processes described at blocks 1206-1214 will be repeated for each sequential reactor in the reaction system.

At block 1216, the waste gas is fractionated into a $CO_2$ enriched stream and a $CH_4$ enriched stream. At block 1218, whichever stream contains the excess reagent can be sold or used as a fuel, while the other stream can be recycled to block 1204 to be reused in the process.

Figure 13:
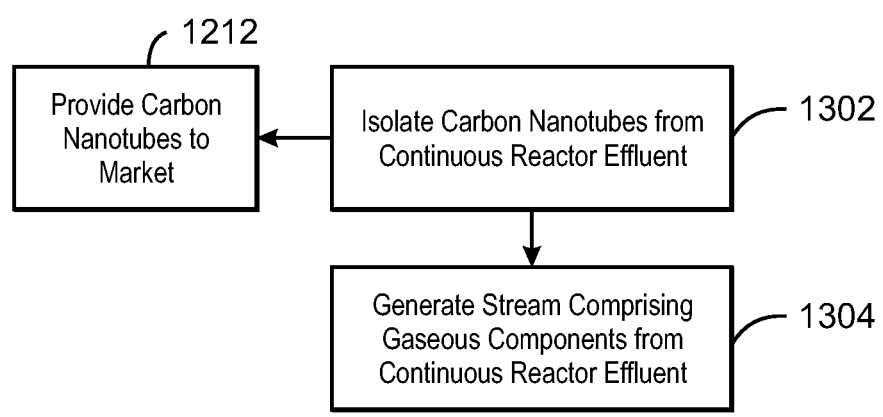
FIG. 13 is a process flow diagram showing a method for removing CNTs from a continuous reactor effluent.

FIG. 13 is a process flow diagram showing a method 1300 for removing CNTs from a continuous reactor effluent. The method 1300 may be included within the block 1210 discussed with respect to the method 1200. The continuous reactor effluent may be a gas flow from the reactor that includes the CNTs as well as waste gas.

The method 1300 begins at block 1302 with the isolation of the CNTs from the continuous reactor effluent. The isolation of the CNTs may be performed within a separation system using any number of separation devices. For example, in some embodiments, a cyclonic or multicyclonic separation device may be used to perform an initial separation of the CNTs from the continuous reactor effluent. In other embodiments, a magnetic separation device or an electrostatic precipitator, among others, may be used to perform the initial separation.

A filtration system may also be used to further separate the CNTs from the continuous reactor effluent. The filtration system may include any number of filters of various types. For example, a sintered ceramic filter, sintered metal filter, fabric bag filter, or fluidized bed filter may be used to filter out any remaining CNTs within the continuous reactor effluent. In various embodiments, at block 1212, the isolated CNTs may then be sent to the market.

At block 1304, a stream containing gaseous components may be generated from the continuous reactor effluent. The stream may be generated through the separation of the CNTs from the continuous reactor effluent. Such a stream containing gaseous components may be the waste gas discussed with respect to FIG. 12. Thus, the stream may then be cooled to remove excess water formed during the reaction, fractionated into a $CO_2$ enriched stream and a $CH_4$ enriched stream, and either sold or recycled, as discussed with respect to blocks 1214-1218 of FIG. 12. In some embodiments, if the stream is recycled, it may be sent back into the fluidized bed reactor to be reused for the creation of the CNTs.

FIG. 13 is not intended to indicate that the steps of the method 1300 are to be executed in any particular order, or that all of the steps of the method 1300 are to be included in every case. Further, any number of additional steps may be included within the method 1300, depending on the specific application. For example, in some embodiments, a separation system may be used to generate a first purified stream of the CNTs and a first residual stream including gaseous components from the continuous reactor effluent. Then, a filtration system may be used to generate a second purified steam of the CNTs and a second residual stream including impurities from the first purified stream of the CNTs. In addition, the first purified stream and the second purified stream may be combined into a final purified stream of the CNTs. In some embodiments, a second separation vessel may also be configured to generate an additional purified stream of the CNTs and an additional residual stream from the continuous reactor effluent or the first purified stream of the CNTs, or both.

EMBODIMENTS

Embodiments of the invention may include any combinations of the methods and systems shown. This is not to be considered a complete listing of all possible embodiments, as any number of variations can be envisioned from the description above.

1. A system for removing carbon nanotubes from a continuous reactor effluent, including a separation vessel configured to:
  isolate the carbon nanotubes from the continuous reactor effluent; and
  generate a stream including gaseous components from the continuous reactor effluent.

2. The system of 1, wherein the separation vessel is configured to: isolate catalyst particles from the continuous reactor effluent; and return the catalyst particles to a reactor.

3. The system of either 1 or 2, wherein the reactor includes a fluidized bed reactor that is configured to accept the catalyst particles from the separation vessel.

4. The system of any of 1-3, wherein the stream includes residual carbon nanotubes.

5. The system of any of 1-4, wherein the separation vessel includes a gravity separation vessel.

6. The system of 5, wherein the gravity separation vessel includes a cyclonic separator.

7. The system of 6, wherein the cyclonic separator includes a single cyclone.

8. The system of 6, wherein the cyclonic separator includes multiple cyclones.

9. The system of 5, wherein the gravity separation vessel includes a drift separator.

10. The system of any of 1-5, wherein the separation vessel includes an electrostatic separation unit configured to impose an electric field.

11. The system of any of 1-5 or 10, wherein the separation vessel includes a magnetic separation vessel.

12. The system of any of 1-5, 10, or 11, wherein the separation vessel includes a filter.

13. The system of 12, wherein the filter includes a sintered ceramic filter, a sintered metal filter, a fabric bag filter, or a fluidized bed filter, or any combinations thereof.

14. The system of 12, wherein the filter is configured to perform a self-cleaning procedure to remove any remaining carbon nanotubes.

15. A method for removing carbon nanotubes from a continuous reactor effluent, including:
flowing the continuous reactor effluent through a separation vessel;
separating carbon nanotubes from the continuous reactor effluent in the separation vessel; and
generating a stream including gaseous components from the continuous reactor effluent.

16. The method of 15, including isolating the carbon nanotubes from the stream including gaseous components through an electromagnetic separation process.

17. The method of either 15 or 16, including isolating the carbon nanotubes from the stream including gaseous components through a gravity separation process.

18. The method of 17, wherein the gravity separation process includes using a cyclonic separator.

19. The method of 18, wherein the cyclonic separator includes a multicyclonic separator.

20. The method of any of 15-17, wherein the separation vessel is configured to generate the carbon nanotubes and the stream including gaseous components through a density based separation process.

21. The method of any of 15-17 or 20, including:
isolating an excess catalyst stream from the continuous reactor effluent; and
flowing the excess catalyst stream to a reactor.

22. A system for creating a purified stream of carbon nanotubes from a gas flow, including:
a separation system configured to generate a first purified stream of the carbon nanotubes and a first residual stream including gaseous components from the gas flow; and
a filtration system configured to generate a second purified steam of the carbon nanotubes and a second residual stream including impurities from the first purified stream of the carbon nanotubes.

23. The system of 22, wherein the separation system is configured to:
isolate an excess reagent stream from the gas flow; and
flow the excess reagent stream to a reactor.

24. The system of either 22 or 23, wherein the separation system includes a multicyclonic separation system or a single cyclonic separation system.

25. The system of any of 22-24, wherein the separation system includes an electrostatic precipitator.

26. The system of any of 22-25, wherein the separation system includes a magnetic separation system.

27. The system of any of 22-26, wherein the separation system includes an inertial separation system.

28. The system of any of 22-27, wherein the filtration system includes a sintered ceramic filtration system, a sintered metal filtration system, a fabric bag filtration system, or a fluidized bed filtration system, or any combinations thereof.

29. The system of any of 22-28, wherein the separation system includes a wet removal system, and wherein the wet removal system includes a venturi scrubber, a counter current water scrubber, a steam condensation system, or a barometric condensation system, or any combinations thereof.

30. The system of any of 22-29, wherein the system is configured to combine the first purified stream and the second purified stream into a final purified stream of the carbon nanotubes.

31. The system of any of 22-30, including a second separation vessel configured to generate an additional purified stream of the carbon nanotubes and an additional residual stream including gaseous components from the gas flow or the first purified stream of the carbon nanotubes, or both.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

What is claimed is:

1. A system for producing carbon nanotubes, comprising:
a reactor to receive and react a feed gas comprising feedstock and a recycle stream with catalyst particles to form carbon nanotubes, and to discharge overhead a continuous reactor effluent comprising the carbon nanotubes and catalyst particles;
a first separation vessel to:
isolate catalyst particles from the carbon nanotubes in the continuous reactor effluent; and
return the catalyst particles via a recycle line to the reactor;
a second separation vessel comprising a cyclonic separator to:
isolate the carbon nanotubes from the continuous reactor effluent; and
generate a waste stream comprising gaseous components from the continuous reactor effluent;
a heat exchanger to condense water in the waste stream to give a dry waste stream; and
a gas fractionation system to process the dry waste stream to give the recycle stream and an excess feed stream, wherein the waste stream comprises residual carbon nanotubes.

2. The system of claim 1, comprising:
a compressor to compress the dry waste gas stream; and
a gas fractionation system to process the compressed dry waste gas stream to give the recycle stream enriched in methane and an excess feed stream enriched in carbon dioxide, wherein the heat exchanger comprises an ambient-temperature heat exchanger, and wherein the recycle line couples the first separation vessel to the reactor.

3. The system of claim 2, comprising a mixer to add the recycle stream to the feedstock to give the feed gas to the reactor, wherein the reactor comprises a fluidized bed reactor.

4. The system of claim 1, comprising a gas fractionation system comprising cryogenic distillation to process the dry waste stream to give the recycle stream and an excess feed stream, wherein the first separation vessel comprises a cyclonic separator.

5. The system of claim 1, wherein the continuous reactor effluent comprises the gaseous components comprising unreacted feed gas, wherein the cyclonic separator comprises a multicyclonic separator to discharge the carbon nanotubes as a product stream.

6. The system of claim 1, wherein the cyclonic separator comprises a swirl element comprising swirl vanes that rotate to impart the radical acceleration or the tangential velocity, or both.

7. The system of claim 1, comprising a mixer to add the recycle stream to the feedstock upstream of the reactor to give the feed gas, wherein the continuous reactor effluent comprises the gaseous components comprising unreacted feed gas, and wherein the dry waste stream comprises a dew point greater than −5° C.

8. The system of claim 7, wherein the mixer comprises a static mixer.

9. The system of claim 1, comprising a filter to remove residual carbon nanotubes from the waste stream, wherein the continuous reactor effluent comprises unreacted feed gas with the carbon nanotubes and catalyst particles, and wherein the heat exchanger comprises an ambient-temperature heat exchanger.

10. The system of claim 9, wherein the second separation vessel to discharge as a product stream the carbon nanotubes isolated from the continuous reactor effluent, wherein the filter to discharge the residual carbon nanotubes into the product stream, and wherein the filter comprises a sintered ceramic filter, a sintered metal filter, a fabric bag filter, or a fluidized bed filter, or any combinations thereof.

11. The system of claim 9, wherein the filter is configured to perform a self-cleaning procedure to remove any remaining carbon nanotubes.

12. The system of claim 1, comprising:
a water separation vessel to receive the condensed water from the heat exchanger, wherein the condensed water to settle in the water separation vessel and discharge from a bottom of the water separation vessel, and wherein the water separation vessel is not a component of the heat exchanger; and
a compressor to compress the dry waste stream to give a compressed dry waste gas stream.

13. The system of claim 1, comprising:
a compressor to compress the dry waste stream to give a compressed dry waste gas stream;
a second heat exchanger to condense water in the compressed dry waste gas stream; and
a gas fractionation system to process the compressed dry waste gas stream to give the recycle stream enriched in methane and an excess feed stream enriched in carbon dioxide.

14. The system of claim 13, comprising a mixer to add the recycle stream to the feedstock to give the feed gas fed to the reactor, wherein the second heat exchanger comprises an ambient-temperature heat exchanger.

15. The system of claim 1, comprising another heat exchanger to heat the feed gas with waste heat from the waste stream.

16. The system of claim 15, wherein the another heat exchanger comprises a shell-and-tube heat exchanger.

17. A method for producing carbon nanotubes, comprising:
combining a feedstock and a recycle gas to give a feed gas fed to a reactor;
reacting the feed gas with a catalyst in the reactor to form carbon nanotubes;
discharging overhead from the reactor a continuous reactor effluent comprising the carbon nanotubes and catalyst particles;
flowing the continuous reactor effluent through a catalyst separation vessel that isolates catalyst particles from the carbon nanotubes in the continuous reactor effluent and returns the catalyst particles via a recycle line to the reactor;
flowing the continuous reactor effluent from the catalyst separation vessel through a carbon-nanotube separation vessel comprising a cyclonic separator comprising a multicyclonic separator having a swirl element that imparts radial acceleration and a tangential velocity component to the continuous reactor effluent; and
separating carbon nanotubes from the continuous reactor effluent in the carbon- nanotube separation vessel, generating a waste stream comprising gaseous components from the continuous reactor effluent.

18. The method of claim 17, comprising:
separating from the waste stream via cryogenic distillation a first stream enriched in methane and a second stream enriched in carbon dioxide, wherein the recycle stream comprises the first stream, and wherein combining comprises adding the recycle stream to the feedstock upstream of the reactor to give the feed gas; and
heating, via a heat exchanger, the feed gas comprising the feedstock and the recycle gas upstream of the reactor with waste heat from the waste stream.

19. The method of claim 17, wherein the recycle line couples the catalyst separation vessel to the reactor, and wherein separating the carbon nanotubes from the continuous reactor effluent in the carbon-nanotube separation vessel comprises isolating via the swirl element by gravity the carbon nanotubes from the waste stream comprising gaseous components and discharging the carbon nanotubes as a product stream.

20. The method of claim 17, wherein the swirl element comprises swirl vanes that rotate to impart the radical acceleration and the tangential velocity component.

21. The method of claim 17, comprising heating, via a heat exchanger, the feed gas with waste heat from the waste stream, wherein the swirl element imparts the radial acceleration and the tangential velocity component through the rotation of twisted swirl vanes on the swirl element.

22. The method of claim 19, comprising:
filtering the waste stream to remove residual carbon nanotubes from the waste stream;
condensing, via a heat exchanger, water in the waste stream; and
adding the residual carbon nanotubes to the product stream.

23. The method of claim 22, comprising:
removing the condensed water from the waste stream to give a dry waste stream; and
compressing the dry waste stream.

24. The method of claim 23, comprising:
condensing, via a second heat exchanger, water in the dry waste stream; and processing the dry waste gas stream in a gas fractionation system to give a first stream enriched in methane and a second stream enriched in carbon dioxide, wherein the recycle stream comprises the first stream.

25. A system for producing carbon nanotubes, comprising:
- a reactor to react a feed gas comprising feedstock and a recycle stream with catalyst to form carbon nanotubes, the reactor comprising an outlet on an upper portion of the reactor to discharge overhead from the reactor a continuous reactor effluent comprising the carbon nanotubes and catalyst;
- a catalyst separation vessel to separate catalyst from carbon nanotubes in the continuous reactor effluent and return the catalyst via a recycle line to the reactor;
- a separation system to generate a first purified stream of the carbon nanotubes and a first residual stream comprising gaseous components from the continuous reactor effluent discharged from the catalyst separation vessel, wherein the separation system comprises a cyclonic separation system comprising a cyclonic separator;
- a filtration system to filter the first residual stream to generate a second purified steam of the carbon nanotubes and a second residual stream comprising the gaseous components, wherein the second residual stream is a waste gas stream; and
- a gas fractionation system to process the dry waste stream to give the recycle stream and an excess feed stream, wherein the waste stream comprises residual carbon nanotubes.

26. The system of claim 25, wherein the catalyst separation vessel comprises a cyclonic separation vessel.

27. The system of claim 25, comprising a heat exchanger to heat the feed gas upstream of the reactor with waste heat from the waste gas stream, wherein the recycle line couples the catalyst separation vessel to the reactor.

28. The system of claim 25, comprising a heat exchanger to condense water in the waste gas stream, wherein the cyclonic separator comprises a swirl element comprising swirl vanes that rotate to impart the radial acceleration and the tangential velocity component, and wherein the filtration system comprises a sintered ceramic filtration system, a sintered metal filtration system, a fabric bag filtration system, or a fluidized bed filtration system, or any combinations thereof.

29. The system of claim 25, wherein the system is configured to combine the first purified stream and the second purified stream into a final purified stream of the carbon nanotubes.

* * * * *